United States Patent
Ito et al.

(10) Patent No.: US 7,890,737 B2
(45) Date of Patent: Feb. 15, 2011

(54) MICROCOMPUTER AND FUNCTIONAL EVALUATION CHIP

(75) Inventors: Naoki Ito, Nagoya (JP); Hideaki Ishihara, Okazaki (JP); Toshihiko Matsuoka, Nukata-gun (JP); Katsutoyo Misawa, Nukata-gun (JP)

(73) Assignee: DENSO CORPORATION, Kariya (JP)

( * ) Notice: Subject to any disclaimer, the term of this patent is extended or adjusted under 35 U.S.C. 154(b) by 350 days.

(21) Appl. No.: 12/155,017

(22) Filed: May 29, 2008

(65) Prior Publication Data

US 2009/0009211 A1 Jan. 8, 2009

(30) Foreign Application Priority Data

| Jul. 2, 2007 | (JP) | ............................. 2007-173981 |
| Sep. 27, 2007 | (JP) | ............................. 2007-251687 |
| Feb. 13, 2008 | (JP) | ............................. 2008-031819 |

(51) Int. Cl.
  *G06F 11/00* (2006.01)
(52) U.S. Cl. .................................................... 712/227
(58) Field of Classification Search ........................ None
  See application file for complete search history.

(56) References Cited

U.S. PATENT DOCUMENTS

| 4,604,692 | A | | 8/1986 | Murakami | |
| 4,905,191 | A | * | 2/1990 | Arai | 714/719 |
| 5,726,991 | A | * | 3/1998 | Chen et al. | 714/704 |
| 6,011,500 | A | * | 1/2000 | Noda et al. | 341/144 |
| 6,058,468 | A | * | 5/2000 | Funyu | 712/39 |
| 6,587,385 | B2 | * | 7/2003 | Ooishi | 365/191 |
| 6,885,212 | B2 | | 4/2005 | Yamamoto et al. | |
| 6,907,555 | B1 | * | 6/2005 | Nomura et al. | 714/719 |
| 6,981,179 | B1 | * | 12/2005 | Shigemasa et al. | 714/36 |

| 7,421,384 | B2 | 9/2008 | Yamada et al. |

(Continued)

FOREIGN PATENT DOCUMENTS

JP  A-03-237533  10/1991

(Continued)

OTHER PUBLICATIONS

K. Tsuji, "Debagging in a multiple core processor with a JTAG emulator," *TRONWARE*, pp. 58-61, vol. 17, 3$^{rd}$ Issue, published from Personal Media Corporation, Jun. 20, 2006.

(Continued)

*Primary Examiner*—Eric Coleman
(74) *Attorney, Agent, or Firm*—Posz Law Group, PLC

(57) ABSTRACT

A microcomputer for functioning according to operation modes includes; a mode counter that counts the number of times of level change in a signal applied to a mode setting terminal; a mode decoder that decodes output data of the mode counter to output a mode signal, which represents one operation mode; a clock input terminal; a data terminal through which serial data is inputted synchronously with a serial clock signal applied to the clock input terminal; a serial-to-parallel conversion unit that converts the serial data into parallel data and stores the parallel data in an input data buffer; and a switching means that switches to a state that a CPU can access to the input data buffer in a test mode. In the test mode, test instruction data is capable of being inputted from an external circuit.

16 Claims, 18 Drawing Sheets

U.S. PATENT DOCUMENTS

| | | | |
|---|---|---|---|
| 7,464,295 B2 * | 12/2008 | Toros et al. | 714/30 |
| 2005/0156589 A1 | 7/2005 | Yamamoto et al. | |
| 2006/0107082 A1 | 5/2006 | Matsuoka et al. | |

FOREIGN PATENT DOCUMENTS

| JP | A-11-316694 | 11/1999 |
|---|---|---|
| JP | A-2001-273274 | 10/2001 |
| JP | A-2002-175196 | 6/2002 |
| JP | A-2003-263404 | 9/2003 |
| JP | A-2005-085215 | 3/2005 |

OTHER PUBLICATIONS

Office Action mailed Oct. 20, 2009 in corresponding Japanese patent application No. 2008-031819 (and English translation).

* cited by examiner

FIG. 5B

| DATA | ADDRESS | R/W | | |
|---|---|---|---|---|
| 16 bit (D15-D0) | 16 bit (A16-A0) | R/W (1:0) | OPERATION | DESCRIPTION |
| | | 0 \| 0 | BYTE READ | A LOW ORDER AND A HIGH ORDER ARE DISCRIMINATED FROM EACH OTHER WITH A0. |
| | | 0 \| 1 | WORD READ | A0 IS FIXED TO 0. TWO WORD READ CYCLES FOR A LONG WORD. |
| | | 1 \| 0 | BYTE WRITE | A LOW ORDER AND A HIGH ORDER ARE DISCRIMINATED FROM EACH OTHER WITH A0. |
| | | 1 \| 1 | WORD WRITE | A0 IS FIXED TO 0. TWO WORD WRITE CYCLES FOR A LONG WORD. |

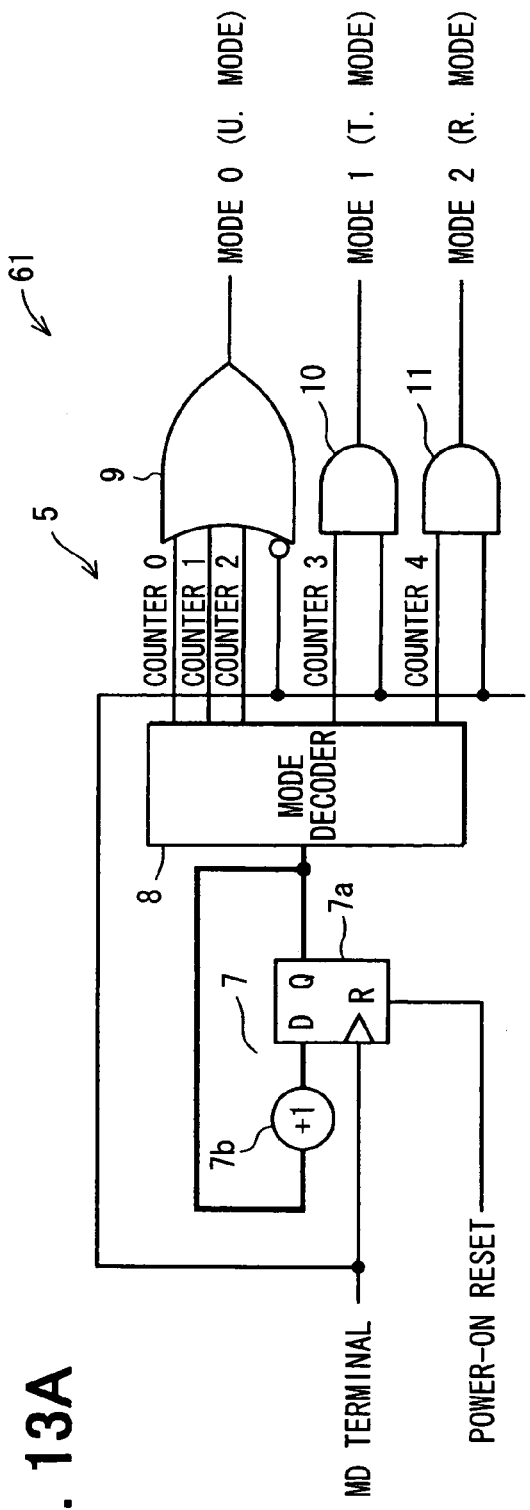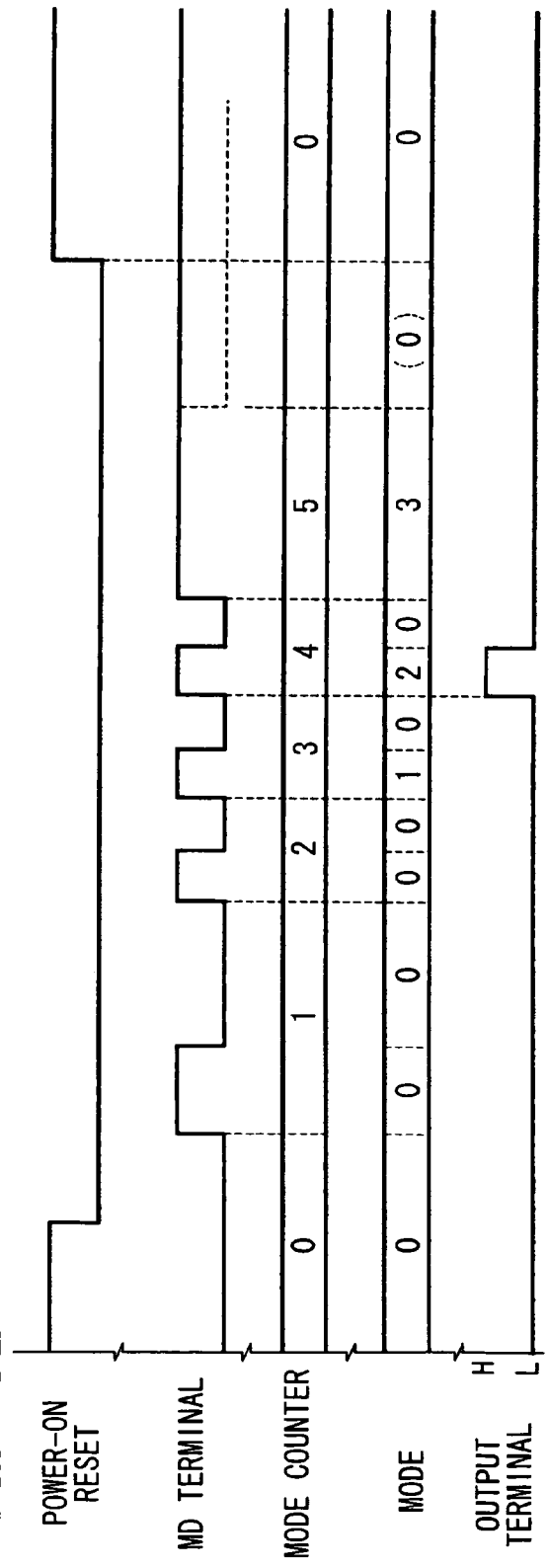
FIG. 13A
FIG. 13B

FIG. 14
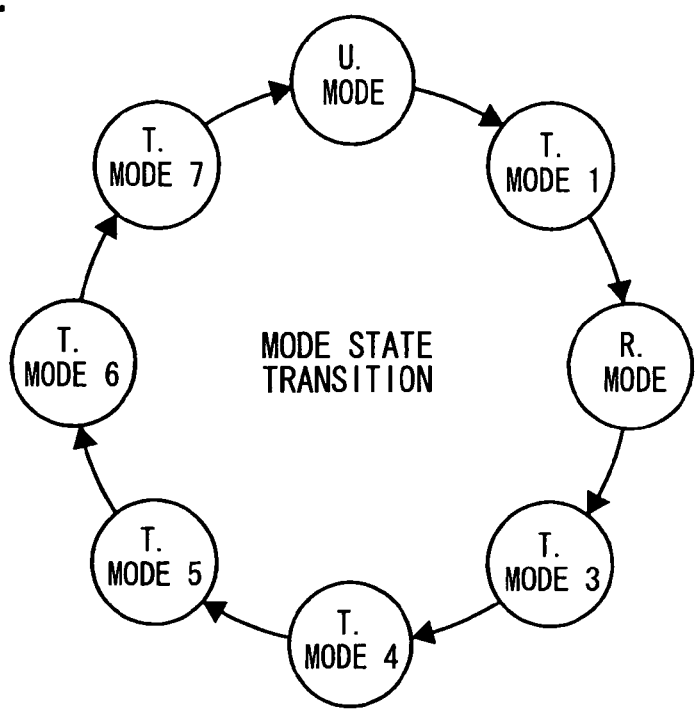
MODE STATE TRANSITION
FIG. 15A
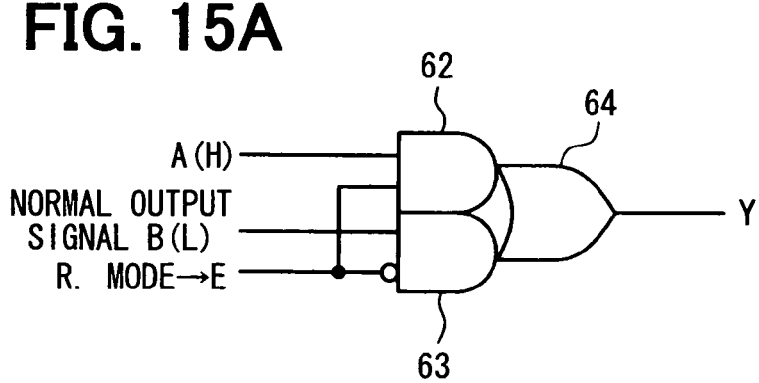
FIG. 15B
| E | Y |
|---|---|
| 0 | B |
| 1 | A |
FIG. 15C
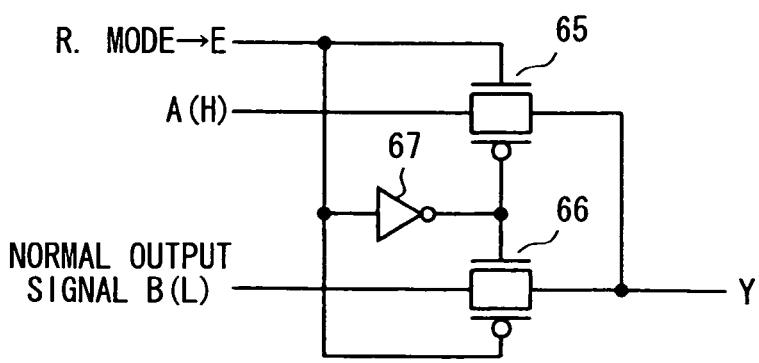
FIG. 15D
| E | Y |
|---|---|
| 0 | B |
| 1 | A |

MICROCOMPUTER AND FUNCTIONAL EVALUATION CHIP

CROSS REFERENCE TO RELATED APPLICATIONS

This application is based on Japanese Patent Applications No. 2007-173981 filed on Jul. 2, 2007, No. 2007-251687 filed on Sep. 27, 2007, and No. 2008-31819 filed on Feb. 13, 2008, the disclosures of which are incorporated herein by reference.

FIELD OF THE INVENTION

The present invention relates to a microcomputer and a functional evaluation chip.

BACKGROUND OF THE INVENTION

As for microcomputers, there is an incessant request for reduction in a chip size. A largest possible decrease in the number of external terminal is therefore an assignment to be achieved. For example, according to a technology disclosed in patent document 1 (JP-A-2001-273247), when an operating mode is externally designated for a microcomputer that operates with multiple operating modes switched, the operating mode is designated based on the level of a signal to be applied to a forcible reset terminal at the timing at which power-on reset is canceled. In this configuration, the necessity of a terminal to be used exclusively to designate an operating mode is obviated.

However, the technology disclosed in the patent document 1 has underlying problems described below.

(1) If noise is convoluted to a reset terminal at the timing at which power-on reset is canceled, there is a fear that an incorrect operating mode may be selected.

(2) If latched data holding an operating mode is affected by, for example, alpha rays or electromagnetic noise, an incorrect operating mode is kept held.

(3) Only two operating modes can be designated.

Thus, it is required to provide a microcomputer capable of being set to a larger number of operating modes with the number of operating mode designation terminals minimized, and a functional evaluation chip that includes the microcomputer and is employed in a development stage.

SUMMARY OF THE INVENTION

In view of the above-described problem, it is an object of the present disclosure to provide a microcomputer that operates in compliance with multiple operating modes each represented by a mode signal decoded by a built-in mode decoder, and to a functional evaluation chip including the microcomputer and an ICE-adaptive chip.

According to a first aspect of the present disclosure, a microcomputer for functioning according to a plurality of operation modes includes: a mode counter that counts the number of times of level change in a signal applied to a mode setting terminal; a mode decoder that decodes output data of the mode counter so as to output a mode signal, wherein the mode signal represents one of the operation modes; a clock input terminal; a data terminal through which serial data is inputted synchronously with a serial clock signal applied to the clock input terminal; a serial-to-parallel conversion unit that converts the serial data into parallel data and stores the parallel data in an input data buffer; and a switching means that switches to a state that a CPU is capable of accessing to the input data buffer when the mode signal represents a test mode. In the test mode, test instruction data is capable of being inputted from an external circuit.

According to the above microcomputer, a larger number of operating modes of a microcomputer can be designated for the microcomputer according to the number of times of a change in the signal level. Further, test instruction data can be externally serially inputted and executed by the CPU. While an increase in the number of terminals is suppressed to a greatest possible extent, the microcomputer can be tested.

According to a second aspect of the present disclosure, a microcomputer for functioning based on a plurality of operation modes includes: a mode signal output unit that outputs a mode signal in accordance with a level of a mode setting signal applied to a mode setting terminal, wherein the mode signal represents one of the operation modes; a clock input terminal; a data terminal through which serial data is inputted synchronously with a serial clock signal applied to the clock input terminal; a serial-to-parallel conversion unit that converts the serial data into parallel data and stores the parallel data in an input data buffer; and a switching means that switches to a state that a CPU is capable of accessing to the input data buffer when the mode signal represents a test mode. In the test mode, test instruction data is capable of being inputted from an external circuit.

According to the above microcomputer, a larger number of operating modes can be designated for the microcomputer according to a change in the signal level. Further, test instruction data can be externally serially inputted and executed by the CPU. An increase in the number of terminals can be suppressed to the greatest possible extent, and the microcomputer can be tested.

According to a third aspect of the present disclosure, a functional evaluation chip for evaluating function of a microcomputer and for debugging software in the microcomputer, the chip includes: the microcomputer according to the first aspect of the present disclosure; and an ICE-adaptive chip having a same function as a part of the function of the microcomputer and including a first connection interface for connecting to an in-circuit emulator. The ICE-adaptive chip is coupled with the microcomputer through a second connection interface. The second connection interface includes the mode setting terminal, a reset signal input terminal, the clock input terminal, and the data terminal; and the ICE-adaptive chip sets the microcomputer to an ICE mode so that a date is inputted to and outputted from the data terminal, the data for evaluating function of the microcomputer and for debugging software in the microcomputer.

According to the above functional evaluation chip, the number of kinds of terminals through which the chips are connected to each other is only four or the same as that in the sole unit of the microcomputer chip. Consequently, the functional evaluation chip can be configured to be a small size at a low cost.

BRIEF DESCRIPTION OF THE DRAWINGS

The above and other objects, features and advantages of the present invention will become more apparent from the following detailed description made with reference to the accompanying drawings. In the drawings:

FIG. 5B is a table for the timing chart;

FIG. 13A is an equivalent diagram of FIGS. 2A and 2B, according to a fourth embodiment, and FIG. 13B is an example of an operating timing chart;

FIG. 14 shows transitions among operating modes;

FIG. 15A and FIG. 15C show the configuration for changing the level at an output terminal from one to another at the time of a transition to a reference mode, and FIGS. 15B and 15D show a table for selection;

DETAILED DESCRIPTION OF THE PREFERRED EMBODIMENTS

First Embodiment

Figure 1:
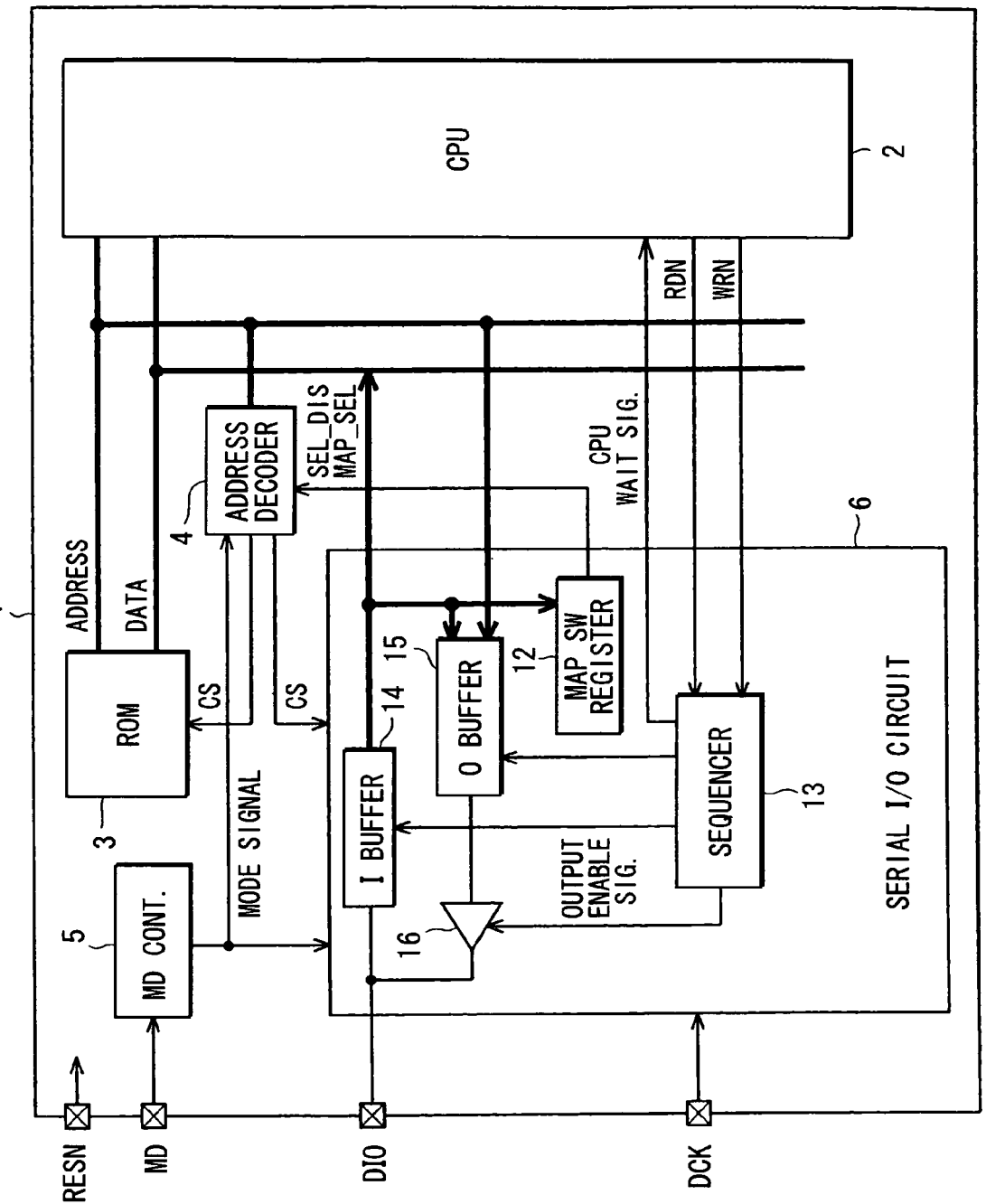
FIG. 1 shows part of the configuration of a microcomputer according to a first embodiment.

Referring to FIG. 1 to FIG. 5, the first embodiment will be described below. FIG. 1 shows part of the configuration of a microcomputer. A microcomputer 1 includes a CPU 2, a ROM (program memory) 3, an address decoder (switching means) 4, a mode control unit 5, and a serial input/output circuit (serial-to-parallel conversion unit) 6. The mode control unit 5 outputs a signal, with which an operating mode is designated for the microcomputer 1, according to the state of a change in an externally fed mode designation signal MD.

When the operating mode is a user mode (i.e., U MODE), the microcomputer 1 operates normally as a product according to a user program stored in the ROM 3. Moreover, when the operating mode is a test mode (i.e., T MODE), the microcomputer 1 fundamentally executes a test instruction that is externally inputted via the serial input/output circuit 6. When the operating mode is an ICE mode, the microcomputer 1 allows a functional unit to operate, the unit which is required based on data externally inputted or outputted via the serial input/output circuit 6.

Figure 2A:
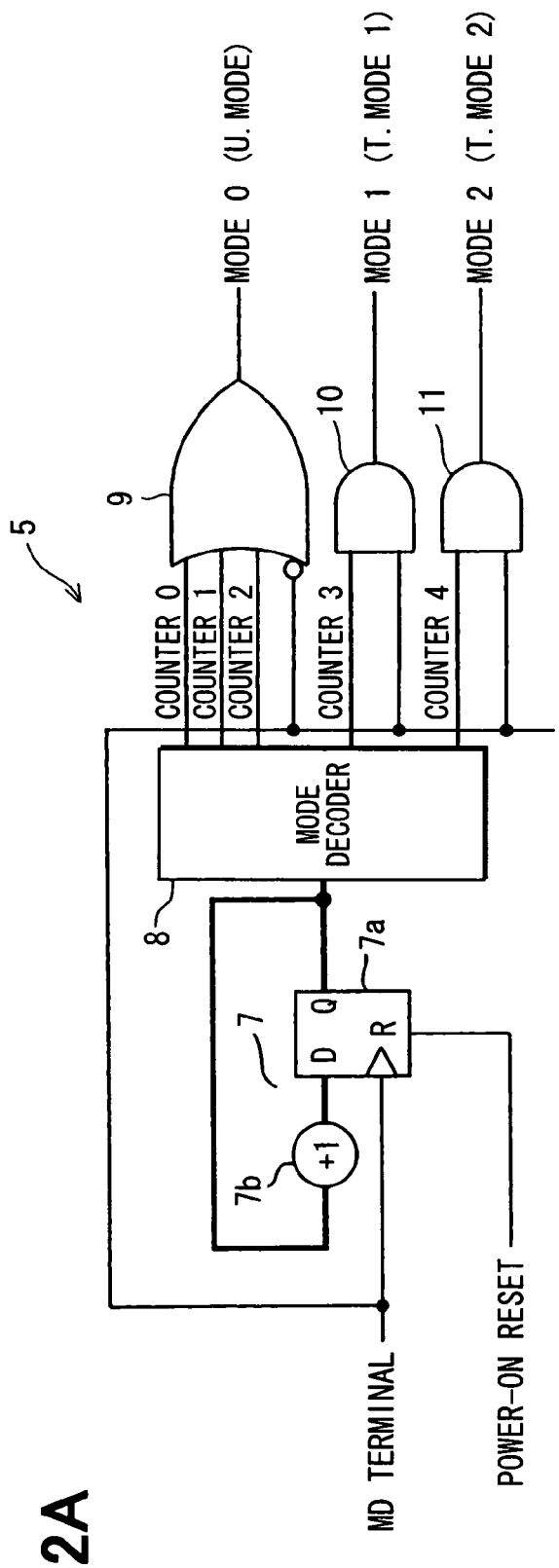
FIG. 2A shows the internal configuration of a mode control unit.
Figure 2B:
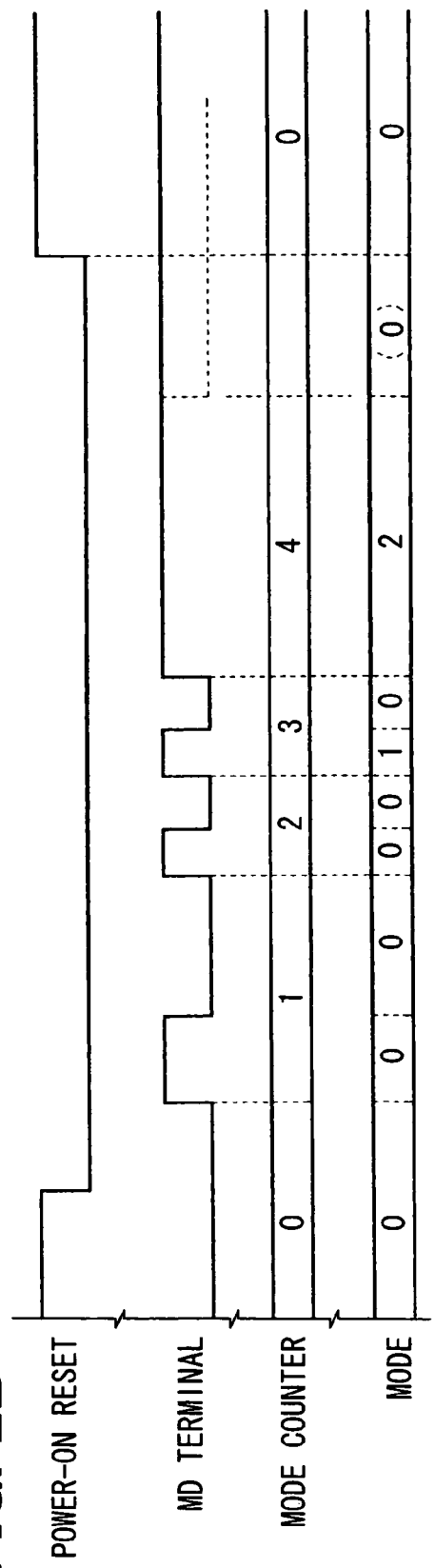
FIG. 2B is an example of an operating timing chart.

FIG. 2A shows the internal configuration of the mode control unit 5, and FIG. 2B is an example of an operating timing chart. The mode control unit 5 includes a mode counter 7 composed of a flip-flop 7a and an adder 7b, a mode decoder 8, an OR gate 9, and AND gates 10 and 11. The Q output terminal of the flip-flop 7a is connected to the D input terminal thereof via the adder 7b. The adder 7b increments input data by +1 and outputs the resultant input data. The clock input terminal of the flip-flop 7a is connected to a mode designation terminal (MD terminal) of the microcomputer 1. The mode counter 7 counts up at every leading edge of the mode designation signal. The flip-flop 7a is reset by a power-on reset signal (active high).

The Q output terminal of the flip-flop 7a is connected to the input terminal of the mode decoder 8. When the mode decoder 8 decodes count data of the mode counter 7, the mode decoder 8 applies the result of the decoding to one of input terminals of the OR gate (four input terminals) and AND gates 10 and 11 respectively. The other input terminals of the gates 9 to 11 (the OR gate 9 is negative-true logic) are connected in common to the MD terminal.

The operation of the mode control unit 5 will be described with reference to FIG. 2B. After the power-on reset signal is changed to a low level and reset is canceled, every time the externally applied mode designation signal is changed from the low level to a high level, a count value of the mode counter 7 is sequentially incremented from 0. However, since the mode designation signal is applied to the other input terminals of the respective gates 9 to 11, whatever the count value is, when the mode designation signal is changed to the low level, the output terminal of the OR gate 9 is changed to the high level. Consequently, a mode 0 (user mode) is designated. When the microcomputer 1 is operated in the user mode, the MD terminal should preferably be used in common with a terminal that is used while being fixed to the low level.

In the configuration shown in FIGS. 2A and 2B, when the count value of the counter 7 ranges from 0 to 2, since the decoded output terminals of the mode decoder 8 are all connected to the input terminals of the OR gate 9, the count values ranging from 0 to 2 are all assigned to the mode 0 of the user mode. Count values equal to or larger than 3 (mode 1, test mode 1) are assigned to the other test modes. This is a fail-safe operation for preventing the microcomputer 1, which is used in the user mode, from being switched to any other mode. Here, Count values equal to or larger than 4 defines a mode 2, i.e., test mode 2.

Referring back to FIG. 1, a mode signal outputted from the mode control unit 5 is fed to the address decoder 4 and serial input/output circuit 6. The address decoder 4 decodes an address outputted from the CPU 2, and selects any of accesses gained by peripheral circuits. The decoding pattern is varied depending on the mode signal and designation made by a map switching resistor (designation register) 12 incorporated in the serial input/output circuit 6. Accordingly, a memory map in the microcomputer 1 is modified.

The serial input/output circuit 6 includes, in addition to the register 12, a sequencer 13, an input buffer (input data buffer) 14, an output buffer (output data buffer) 15, and a bus buffer 16. When a mode signal represents a test mode or an ICE mode, the serial input/output circuit 6 is validated. When serial data is externally inputted through the serial clock input terminal (DCK terminal) of the microcomputer 1 or the serial data input/output terminal (DIO terminal) thereof, the data is stored in the input buffer 14, serial-to-parallel converted, and outputted onto a data bus in the microcomputer 1.

When data is outputted from the CPU 2 to outside, data, which the CPU 2 has stored in the output buffer 15, is parallel-to-serial converted, and the serial data is outputted through the DIO terminal via the bus buffer 16. The data conversion processing is controlled synchronously with a serial clock DCK by the sequencer 13. At this time, the sequencer 13 references a read control signal RDN and a write control signal WRN (active low) that are fed from the CPU 2. If necessary, the sequencer 13 outputs a wait signal, which causes execution of a bus cycle to stand by, to the CPU 2. Moreover, an RESN terminal is a reset signal terminal through which reset of the microcomputer 1 is externally controlled.

Figure 3:
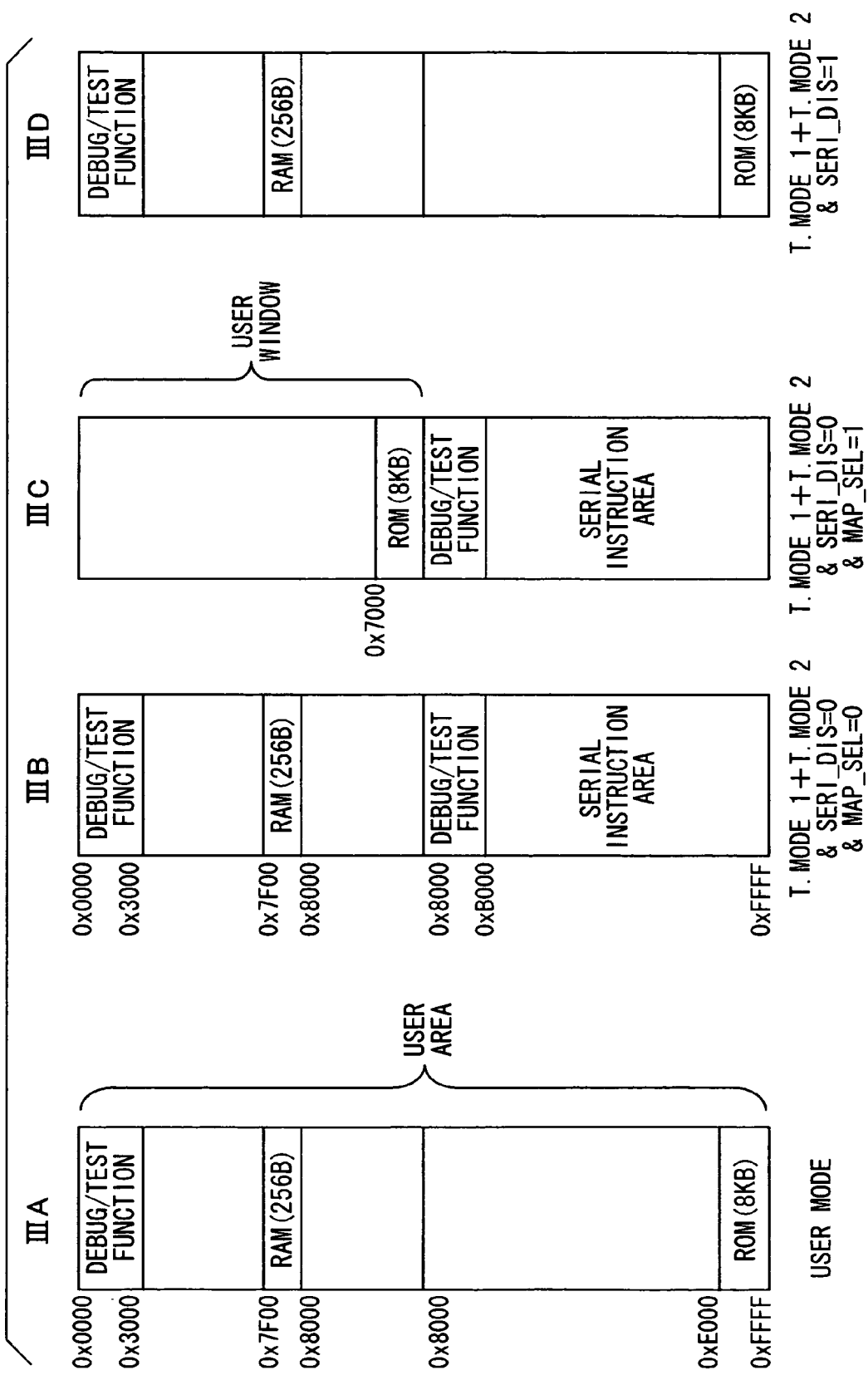
FIG. 3 shows a memory space in the microcomputer, wherein IIIA represents a user mode, and IIIB to IIID represents the memory space in test modes.

FIG. 3 shows memory spaces (maps) in case of serial instruction to be switched according to mode designation for the microcomputer 1 and specification in the map switching register 12. IIIA in FIG. 3 is concerned with a user mode, and IIIB to IIID are concerned with test modes 1 and 2. In the case of the test modes, three types of memory spaces are switched according to the specification in the map switching register 12. The map switching register 12 is a register having a length of two bits of SERI-DIS and MAP-SEL. According to whether the setting of the two bits is 00, 01, or 1–, the memory spaces are switched as shown in IIIB to IIID in FIG. 3.

In IIIB, allocation of addresses 0x0000 to 0x8000 is identical to that in the user mode (the first half of a user area) (user window). Addresses 0x8000 to 0xB000 are, similarly to addresses 0x0000 to 0x3000, allocated to a peripheral function debugging/testing facility. Addresses 0xB000 to 0xFFFF are defined as a serial instruction area.

In IIIC, the first half ranging from address 0x0000 to address 0x8000 is, similarly to the second half of the user area, defined as a user window. The second half ranging from 0x8000 to 0xFFFF is defined as a serial instruction area. IIID shows the same map as that in the user mode shown in IIIA. Namely, the map is used in a case a program stored in the ROM 3 is run even in the test mode.

As for specification of data in the map switching register 12, data externally set in the input buffer 14 may be transferred directly to the register 12 by a logic circuit, which operates under a predetermined condition when a mode signal registers a test mode. Otherwise, a register 12 specification instruction may be fed to the CPU 2 using the data so that the CPU 2 will write the data in the register 12.

Figure 4:
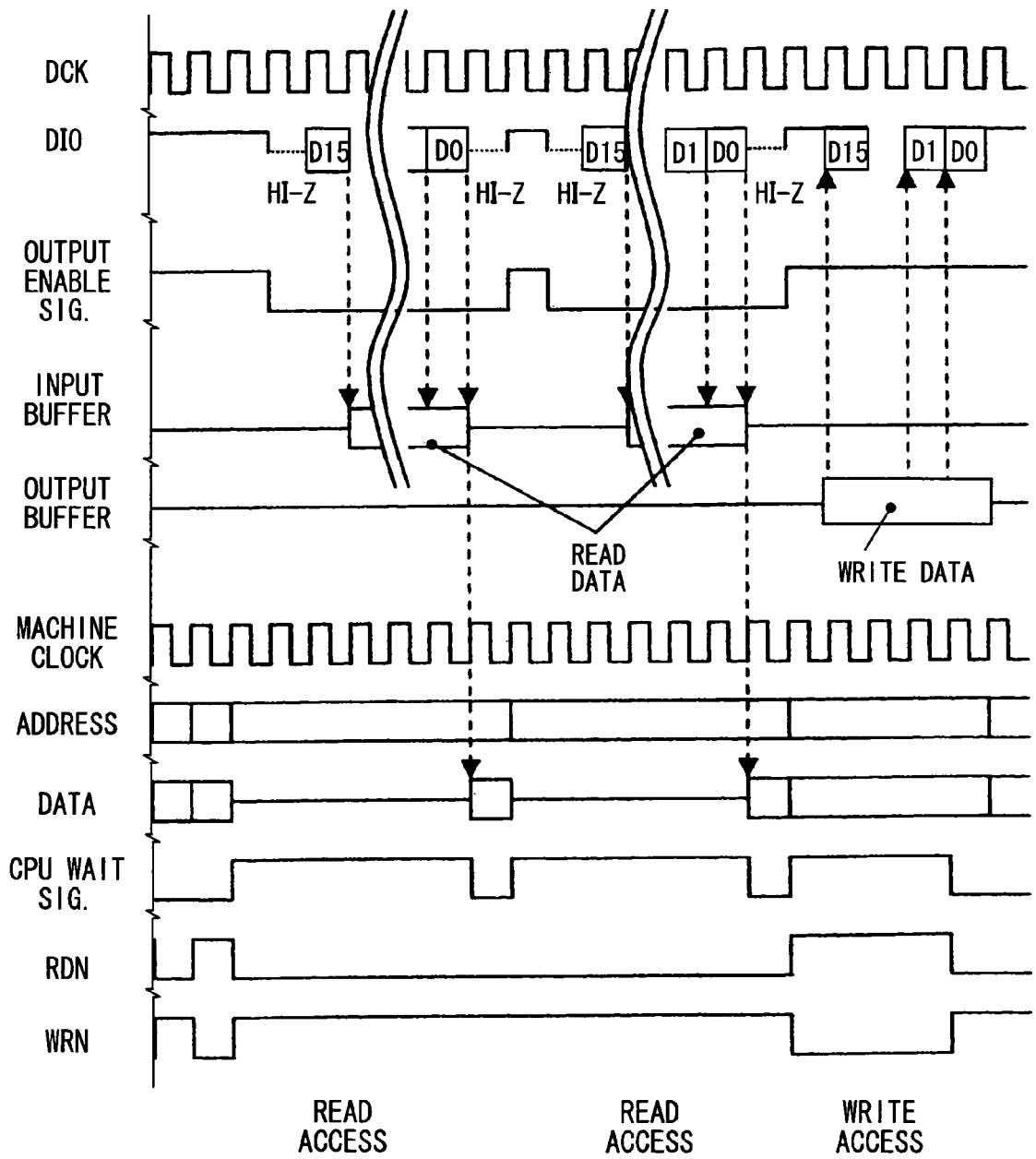
FIG. 4 is a timing chart (part 1) for the test mode.

Next, the operation of the present embodiment will be described with reference to FIG. 4 and FIGS. 5A and 5B. These drawings are timing charts concerning a case where: the microcomputer 1 is set to the test mode 1 or 2; and a test instruction is inputted or test data is outputted via the serial input/output circuit 6. FIG. 4 shows a serial instruction waveform in the test mode 1. As shown in FIG. 4, in the test mode 1, data is inputted or outputted to or from the microcomputer 1. Specifically, when serial data of 16 bits D15 to D0 long is inputted externally (DCK and DIO in FIG. 4), the data is sequentially stored in the input buffer 14. In this case, as a machine clock (operational clock) of the microcomputer 1, a clock synchronous with the clock DCK is adopted (DCK and MACHINE CLOCK in FIG. 4).

While the serial data D15 to D0 is inputted, the sequencer 13 activates a wait signal for the CPU 2 and causes execution of a bus cycle to stand by (CPU WAIT SIGNAL in FIG. 4). At the time point when the 16-bit data has been stored in the input buffer 14, the wait signal is inactivated. Consequently, the CPU 2 executes a read cycle for the input buffer 14, and reads data (test instruction). The CPU 2 then decodes the test instruction and executes it.

Immediately before the serial data D15 is outputted, and immediately after the serial data D0 is outputted, a serial data bus is brought to a high impedance (HI-Z) state. This is regarded as a breakpoint of initiating or terminating serial data output. While the serial data is stored in the input buffer 14, the bus buffer 16 is disabled by the sequencer 13.

On the other hand, when the CPU 2 outputs data to outside, the CPU 2 gains a write access to the output buffer 15 so as to store 16-bit data therein (OUTPUT BUFFER in FIG. 4). In this case, the bus buffer 16 is enabled, and the stored data is serially outputted to outside through the DIO terminal.

Figure 5A:
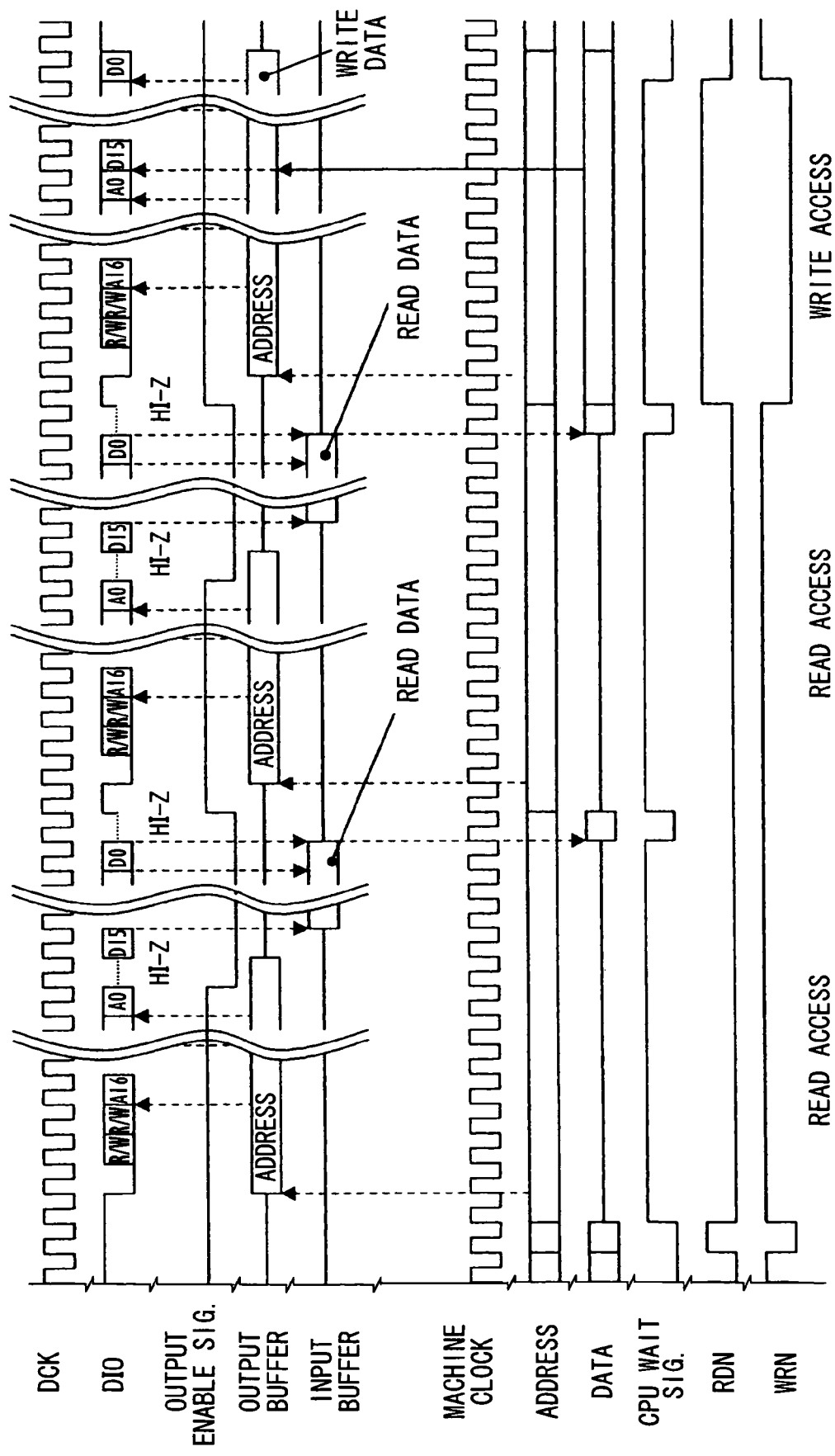
FIG. 5A is a timing chart (part 2) for the test mode.

FIGS. 5A and 5b show a timing chart relevant to the test mode 2 and concerned with a case where the CPU 2 serially outputs address bits, which are outputted inside the microcomputer 1, to outside. Specifically, FIG. 5A shows a serial instruction waveform in the test mode 2. In this case, as shown in OUTPUT BUFFER in FIG. 5A, when the address which includes bits A16 to A0 and which the CPU 2 has outputted so as to gain a read access to the input buffer 14 is stored in the output buffer 15, the address bits are, as shown in DIO in FIG. 5A, serially outputted. In this case, prior to the output of the address bit A16, 2-bit data R/W representing the cycle mode of the CPU 2 is transmitted. The data R/W is logically produced by combining a control signal RDN or WRN outputted from the CPU 2 with an access mode signal (not shown). As shown in FIG. 5A, the data R/W represents four cycles of byte read, word read, byte write, and word write.

When an address of 17 bits A16 to A0 long is outputted, a wait state is canceled (CPU WAIT SIGNAL in FIG. 5A). The CPU 2 accesses, similarly in the test mode 1, the input buffer 14 so as to read data. In the case of a write access, a write address stored in the output buffer 15 is serially outputted succeedingly to transmission of 2-bit data R/W (OUTPUT BUFFER in FIG. 5A). When the wait state is canceled (CPU WAIT SIGNAL in FIG. 5A), the CPU 2 writes data in the output buffer 14 (DATA in FIG. 5A). The written data is then serially outputted succeedingly to the address.

As mentioned above, according to the present embodiment, the mode decoder 8 decodes output data of the mode counter 7 that counts the number of times of a change in the level of a mode designation signal applied to the MD terminal, and outputs a mode signal internally of the microcomputer 1. Consequently, a larger number of operating modes can be designated for the microcomputer 1 according to the number of times of a change in the signal level.

When a mode signal represents a test mode, the address decoder 4 performs switching so that the CPU 2 can access the input buffer 14. Externally inputted serial data is stored in the input buffer 14 via the serial input/output circuit 6. Therefore, test instruction data can be externally serially inputted and executed by the CPU 2. The microcomputer 1 can therefore be tested in a configuration having an increase in the number of terminals thereof suppressed to the greatest possible extent.

Moreover, when a test instruction is a data output instruction for outside, the serial input/output circuit 6 serially converts data, which the CPU 2 has outputted onto a data bus and stored in the output buffer 15, so that the data can be outputted to outside. In a test, an internal data value can be serially outputted and monitored outside.

Further, when the MD terminal exhibits a high level, the mode decoder 8 performs a decoding operation according to a count value of the mode counter 7. When the MD terminal exhibits a low level, the mode decoder 8 decodes data of a user mode. For example, in a field, if a case where the microcomputer 1 is operated in the user mode exclusively takes place, the MD terminal is fixed to the low level. Consequently, the possibility that the microcomputer 1 may malfunction in any other mode while being affected by noise or the like can be eliminated.

Moreover, since the MD terminal is also used in common with a terminal to be used while having an input signal level fixed to a low level during operation in a user mode, a terminal through which the signal level is set for the purpose of operating the microcomputer 1 in the user mode need not be additionally included. An increase in the number of terminals can be suppressed.

Moreover, even when a mode signal represents a test mode, the address decoder 4 allows the CPU 2 to access the ROM 3 which the CPU 2 accesses when operating in the user mode. Even in the test mode, similarly to the user mode, the microcomputer can be operated based on instructions described in a program read from the ROM 3. In this case, the address decoder 4 switches decoding patterns, which determine address maps, according to a data value specified in the map switching register 12 via the serial input/output circuit 6. Therefore, changing objects of access, that is, selective switching of the address maps can be readily achieved externally.

Second Embodiment

FIG. 6 to FIG. 9 show a second embodiment. The same reference numerals as those of the first embodiment will be assigned to identical components, and the description of the components will be omitted. Different components alone will be described below. In the second embodiment, an in-circuit emulator (ICE) is used to configure an evaluation chip (EVA chip) for use in development of the microcomputer 1. The microcomputer 1 that is a product is incorporated in the EVA chip.

Figure 6:
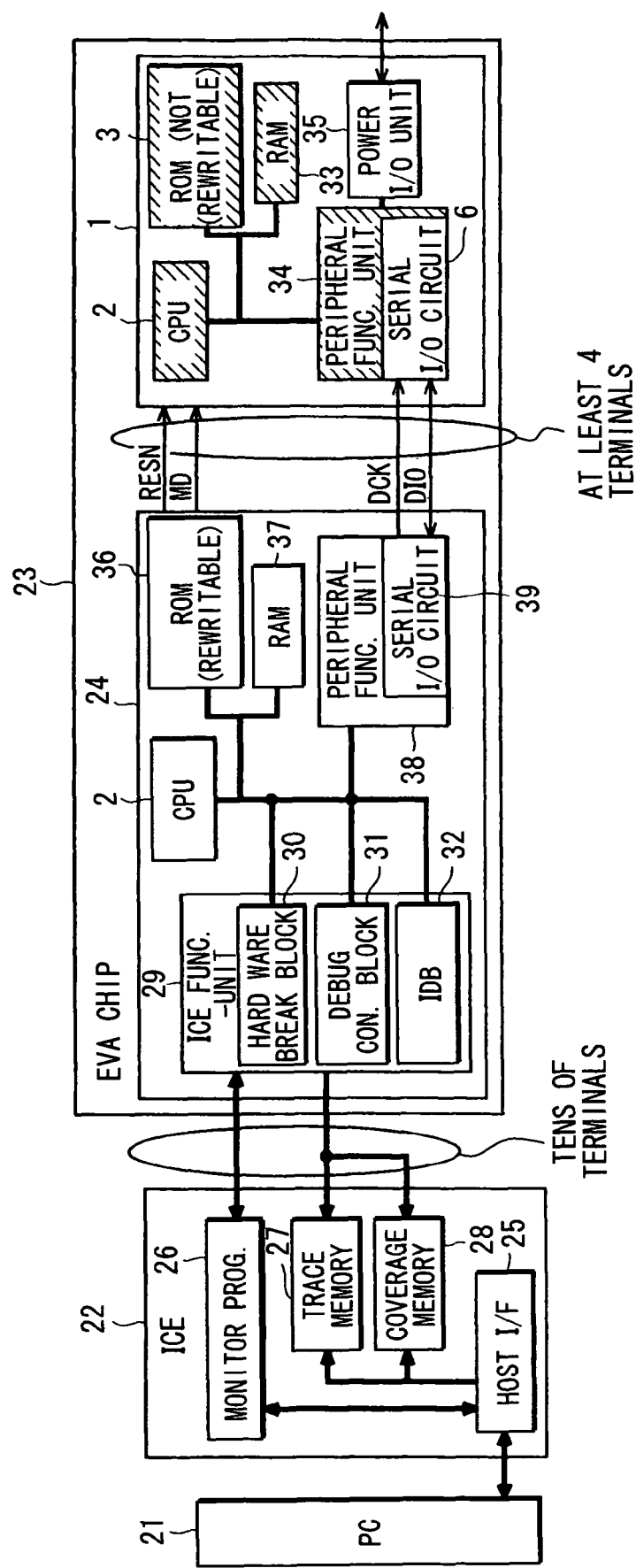
FIG. 6 shows the configuration of a development system with an ICE and an EVA chip centered on, according to a second embodiment.

FIG. 6 shows the configuration of a development system with the ICE and EVA chip centered on. An ICE 22 is connected to a personal computer (PC that is a host) 21, and an EVA chip 23 is connected to the ICE 22. The EVA chip 23 includes a standard chip (ICE-adaptive chip) 24 and the microcomputer 1. The ICE 22 communicates with the personal computer 21 via a host interface (I/F) 25 such as a universal serial bus (USB). In addition, the ICE 22 includes a monitor program 26 that allows execution of various facilities, and a trace memory 27 and a coverage memory 28 in which the results of execution of a trace facility or a coverage facility are stored.

The standard chip 24 includes an ICE functional unit 29 serving as an interface facility for the ICE 22. The ICE functional unit 29 includes a hardware break functional block 30, a debugging control block 31, and an Internet debugging block (IDB) 32, and is realized with, for example, a field programmable gate array (FPGA).

The microcomputer 1 is further provided with a peripheral functional unit 34 including the RAM 33 and serial input/output circuit 6, and a power input/output unit 35 including, for example, a gate drive circuit of a power MOSFET, though they are not introduced in relation to the first embodiment. The standard chip 24 includes a CPU 2 identical to that included in the microcomputer 1, a ROM (a rewritable flash memory or the like) 36 corresponding to the ROM 3, and a RAM 37 and a peripheral functional unit 28 corresponding to the RAM 33 and peripheral functional unit 34 respectively. Moreover, the peripheral functional unit 38 includes a serial input/output circuit 39 corresponding to the serial input/output circuit 6.

The standard chip 24 and microcomputer 1 are connected to each other through four kinds of terminals RESN, MD, DIO, and DCK. Thus, the number of inter-chip connection terminals is equal to or larger than four. Here, several tens of terminals are disposed between the ICE 22 and the EVA chip 23. Serial communication is performed between the serial input/output circuits 39 and 6, whereby a debugging instruction fed from the personal computer 21 via the ICE 22 is executed. Moreover, the peripheral functional unit 34 of the microcomputer 1 includes a component (for example, a gate array) realized with a digital circuit as a peripheral circuit of the CPU 2. The peripheral functional unit 38 of the standard chip 24 also includes the same component.

Specifically, the standard chip 24 includes the CPU 2 and peripheral functional unit 38 that have the same functions as those included in the microcomputer 1. Therefore, debugging the facilities can be performed on the standard chip 24 side. However, the power input/output unit 35 included in the microcomputer 1 is a component fabricated through a high-dielectric strength process. There is difficulty in including the same functional part in the standard chip 24 realized with an FPGA.

When the ICE 22 uses the EVA chip 23 to perform debugging, the power input/output unit 35 is debugged using the microcomputer 1 that is a product. The other facilities are debugged on the standard chip 24 side. In FIG. 6, the functional units of the microcomputer 1 that are stopped in an ICE mode are hatched.

Figure 7:
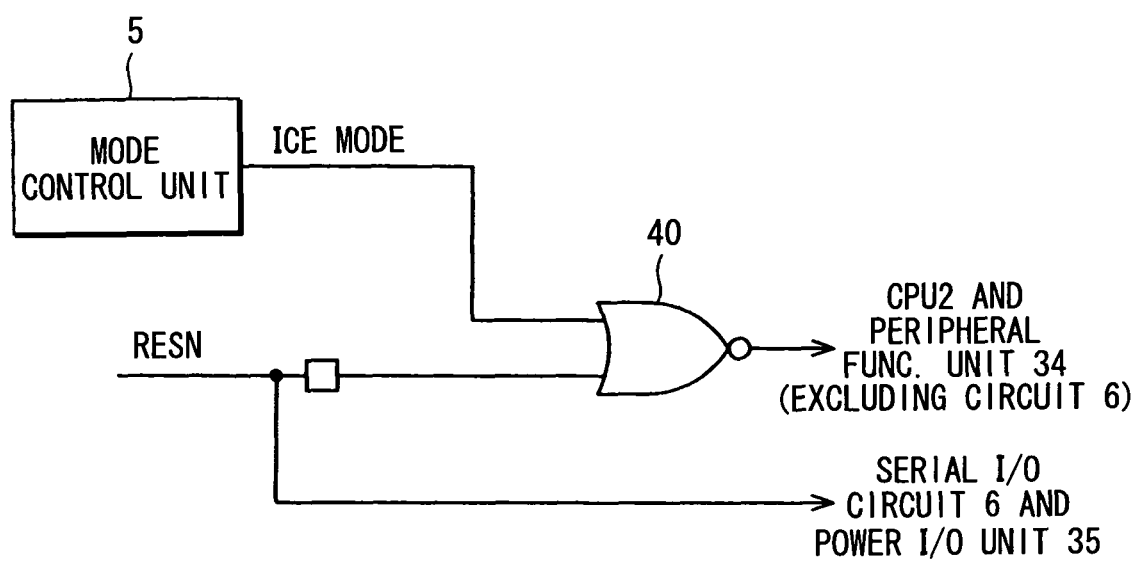
FIG. 7 shows a configuration for performing reset control on a microcomputer side.

FIG. 7 shows a component that is needed for the foregoing assignment of debugging and subjected to reset control on the microcomputer 1 side. The standard chip 24 can control powering up of the microcomputer 1. After the standard chip 24 is first powered up, the microcomputer 1 is powered up at appropriate timing. At this time, the standard chip 24 changes a mode designation signal from one level to another so as to set the microcomputer 1 to an ICE mode, and controls reset through the RESN terminal.

At this time, in the microcomputer 1, the mode control unit 5 outputs an ICE mode signal. The ICE mode signal is fed as a reset signal to the peripheral functional unit 34 other than the CPU 2 and serial input/output circuit 6 via the NOR gate 40. Moreover, the RESN terminal is connected to the other input terminal (negative-true logic) of the NOR gate 40. An external reset signal is directly fed to the serial input/output circuit 6 and power input/output unit 35 through the RESN terminal.

In other words, in the ICE mode, the reset signal fed via the NOR gate 40 remains active irrespective of the state of the external reset signal. The CPU 2 and peripheral functional unit 34 are reset and do not operate. The serial input/output circuit 6 and power input/output unit 35 that should be functioned for debugging are enabled to operate as soon as the external reset signal is canceled.

Figure 8B:
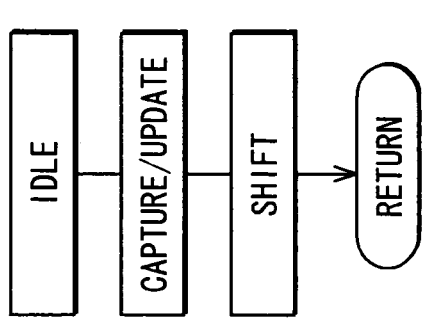
FIG. 8B is a flow chart of the serial communication.
Figure 8A:
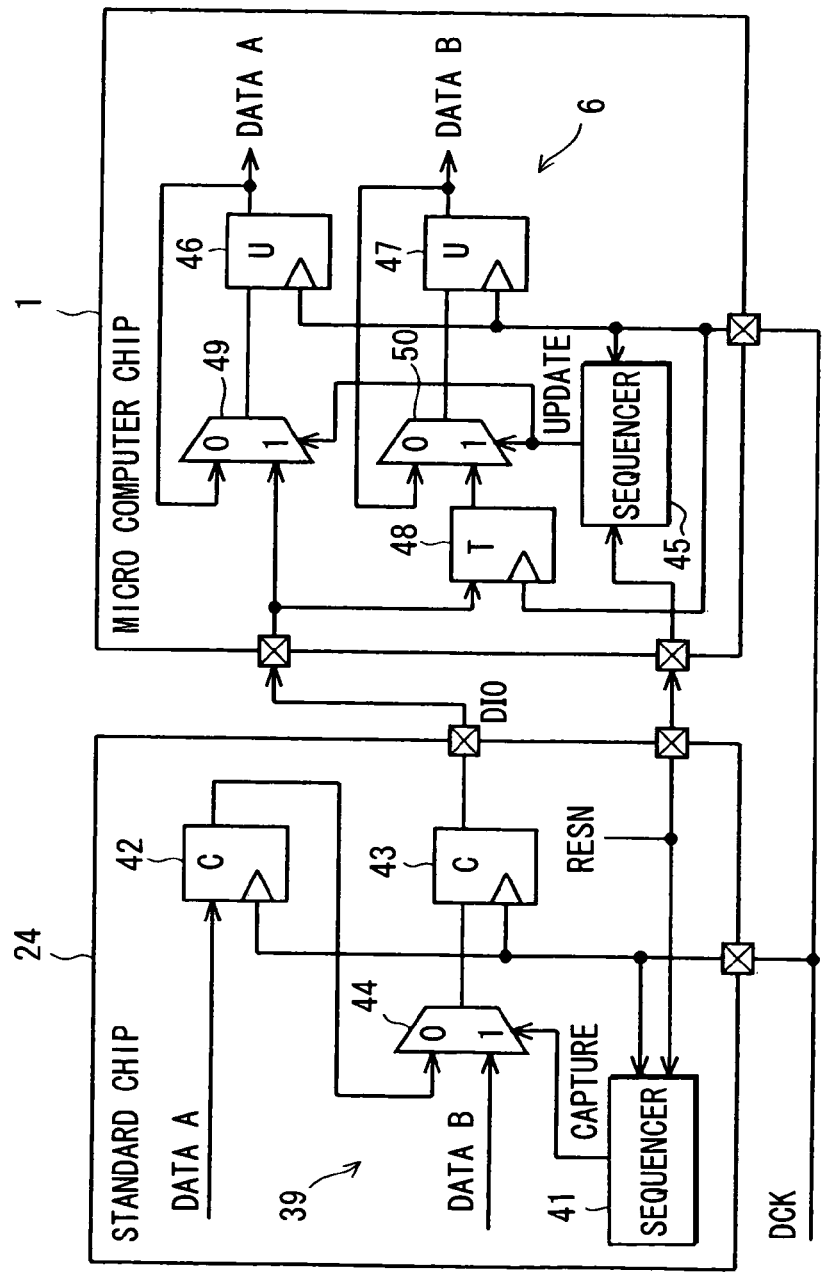
FIG. 8A shows an example of serial communication between a standard chip and a microcomputer chip.

FIGS. 8A and 8B show an example of serial communication to be performed between the standard chip 24 and microcomputer 1 via the serial input/output circuits 39 and 6. This example is concerned with a case where data to be outputted from the standard chip 24 to two functional units of the microcomputer 1 is transmitted bit by bit alternately to the functional units. The serial input/output circuit 39 includes a sequencer 41 that outputs a capture signal on the basis of the DCK signal, capture registers 42 and 43 that latch data according to the DCK signal, and a multiplexer 44 that selects an input according to the capture signal. The sequencer 41 has a built-in counter that repeatedly outputs a count value of 0 or 1 according to the DCK signal, and outputs the capture signal that exhibits a high level when the count value is 0 (that is, a half-frequency signal of the DCK signal). Moreover, when the capture signal exhibits a high level, the multiplexer 44 selects an input side 1. When the capture signal exhibits a low level, the multiplexer 44 selects an input side 0.

On the other hand, the serial input/output circuit 6 includes a sequencer 45 that outputs an update signal according to the DCK signal, update registers 46 and 47 that latch data according to the DCK signal, a temporary register 48, and multiplexers 49 and 50 that select an input according to the update signal. The sequencer 45 has a built-in counter that repeatedly outputs, similarly to the sequencer 41, a count value of 0 or 1 according to the DCK signal, and outputs the update signal that exhibits a high level when the count value is 0. A reset signal RESN is fed to both of the sequencers 41 and 45. Moreover, when the update signal exhibits the high level, the multiplexers 49 and 50 select respective input sides 1. When the update signal exhibits a low level, the multiplexers 49 and 50 select respective input sides 0.

In the serial input/output circuit 39, output data on one channel (data A) is applied to the input side 0 of the multiplexer 44 via the register 42. Data on the other channel (data B) is applied to the input side 1 of the multiplexer 44. Data to be outputted via the multiplexer is transmitted to the microcomputer 1 via the register 43, and inputted to the serial input/output circuit 6 through the DIO terminals.

On the serial input/output circuit 6 side, the DIO terminal is connected to the input terminal of the register 48 and the input side 1 of the multiplexer 49. Output data of the multiplexer 49 is outputted via the register 46 (data A). Moreover, output data of the register 46 is applied to the input side 0 of the multiplexer 49. Output data of the register 48 is outputted via the register 47 through the input side 1 of the multiplexer 50 (data B). The output data of the register 47 is, similarly to the output data of the register 46, applied to the input side 0 of the multiplexer 50.

Next, transmission and reception of serial data between the serial input/output circuits 39 and 6 will be described with reference to the timing chart of FIG. 9. On the standard chip 24 side, when the level of a reset signal RESN is changed from a low level to a high level (RESN in FIG. 9), an enabling signal counter-en for the counters in the sequencers 41 and 45 respectively is activated at the next leading edge of the DCK signal (COUNTER-EN in FIG. 9). The counters reset the count values to 0 and initiate a counting operation at the next leading edge of the DCK signal. Thus, the synchronism between the sequencers is established.

Figure 9:
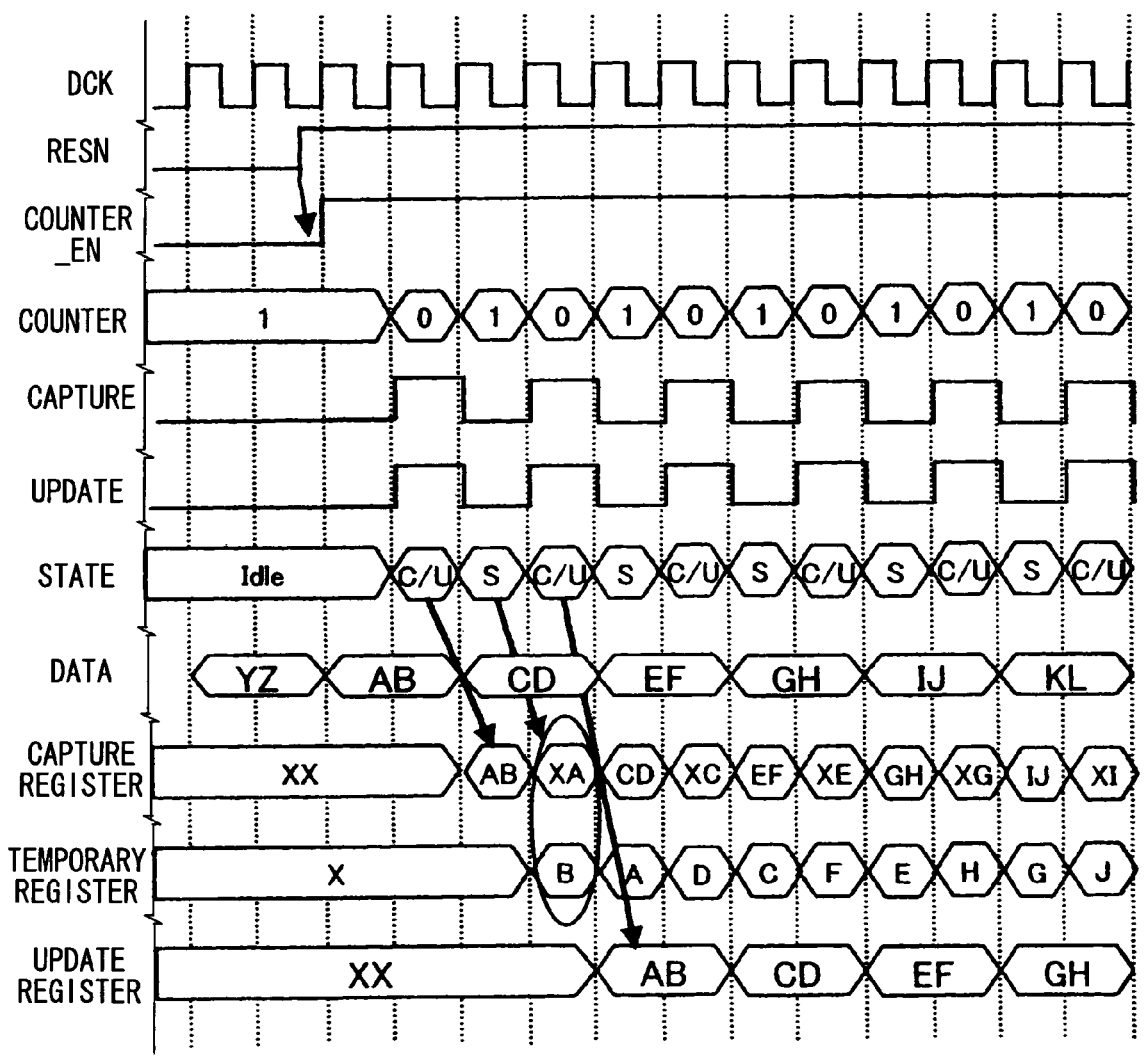
FIG. 9 is a timing chart for the serial communication.

According to a change from 0 to 1 in the counter value, the capture signal and update signal are simultaneously changed to a high level along with every other clock pulse of the DCK signal (COUNTER and UPDATE in FIG. 9). In FIG. 9, STATE indicates transitions made among states according to the operations of the counters. While the counters are disabled, an idle state is established. When the counter values are 0s, a capture/update (C/U) state is established. When the counter values are 1s, a shift (S) state is established.

On the serial input/output circuit 39 side, when data items A and B of 1 bit long are prepared on the input side (DATA in FIG. 9), the data items are stored in the capture registers 42 and 43 respectively at the next leading edge of the DCK signal (CAPTURE REGISTER in FIG. 9). At the next leading edge of the DCK signal, the data B stored in the register 43 is stored in the temporary register 48 on the serial input/output circuit 6 side (TEMPORARY REGISTER in FIG. 9).

Concurrently, the data B held in the capture register 42 is selected by the multiplexer 44 at the timing at which the capture signal is changed to a low level. When the data B is stored in the temporary register 48 on the serial input/output circuit 6 side, the data A is stored in the capture register 43 at the same time.

In the above state, on the serial input/output circuit 6 side, since the update signal is changed to a high level, the data A is selected by the multiplexer 49 and the data B is selected by the multiplexer 50. At the next leading edge of the DCK signal, the data items A and B are stored in the update registers 46 and 47 respectively. The update signal is then changed to a low level. Since the multiplexers 49 and 50 select the output sides of the update registers 46 and 47 respectively, the data items in the registers 46 and 47 remain unchanged at the next leading edge of the DCK signal. The data items A and B are held intact.

By repeating the foregoing process, data items A and B, C and D, E and F; or G and H outputted on two channels inside the standard chip 24 are serially outputted to the microcomputer 1 side. Inside the microcomputer chip 1, the serial data is separated into two channels (in this case, two input buffers are prepared). For example, assuming that data items on two channels are transmitted in units of 8 bits, the counter in the sequencer is designed to handle 4 bits so that the counter value will range from 0 to 15. While the count value ranges from 0 to 7, the capture signal and update signal are held at a high level. While the count value ranges from 8 to 15, the signals are held at a low level.

As mentioned above, according to the second embodiment, the microcomputer chip 1 and the standard chip 24 that includes the same functions as part of those of the microcomputer chip 1 and also includes the ICE functional unit 23 which serves as a connection interface for the ICE 22 constitute the EVA chip 23. When functional evaluation of the microcomputer 1 or software debugging thereof is performed, the standard chip 24 and microcomputer chip 1 are connected to each other through the MD terminals, RESN terminals, DCK terminals, and DIO terminals. When the microcomputer chip 1 is set to an ICE mode, data required for a functional evaluation or software debugging operation is outputted from the standard chip 24 to the microcomputer chip 1 through the DIO terminals.

As an art related to the foregoing EVA chip, there is one disclosed in, for example, JP-A-2002-175196. A configuration disclosed in the publication also has fundamentally a product chip of a microcomputer and an ICE-adaptive chip connected to each other. However, the number of kinds of connection terminals between the chips is as considerably large as several tens of terminals. Moreover, a dedicated circuit for controlling the ICE-adaptive chip and a signal interface has to be included in the functional evaluation chip.

In contrast, according to the EVA chip 23 of the second embodiment, the number of kinds of terminals through which the standard chip 24 and microcomputer chip 1 are connected to each other is four. The number of kinds of terminals is the same as that in the sole unit of the microcomputer chip 1. Consequently, the standard chip 24 can be designed to have a small size at a low cost.

Moreover, when the microcomputer chip 1 is set to an ICE mode, the components thereof corresponding to the facilities mounted in the standard chip 24 are stopped through reset control. For evaluation of the functions of the components, the facilities on the standard chip 24 side are evaluated. On the microcomputer chip 1 side, the power input/output unit 35 whose inclusion in the standard chip 24 is hard to do is operated in order to evaluate the function.

Third Embodiment

Figure 10:
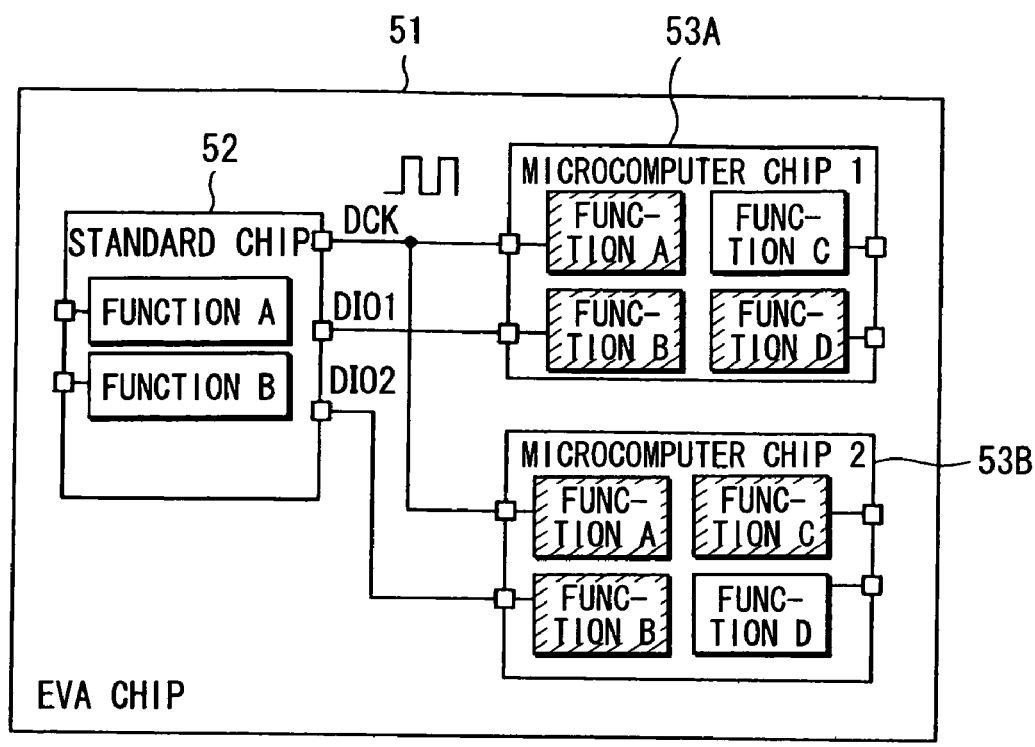
FIG. 10 is an equivalent diagram of FIG. 6, according to a third embodiment.
Figure 11:
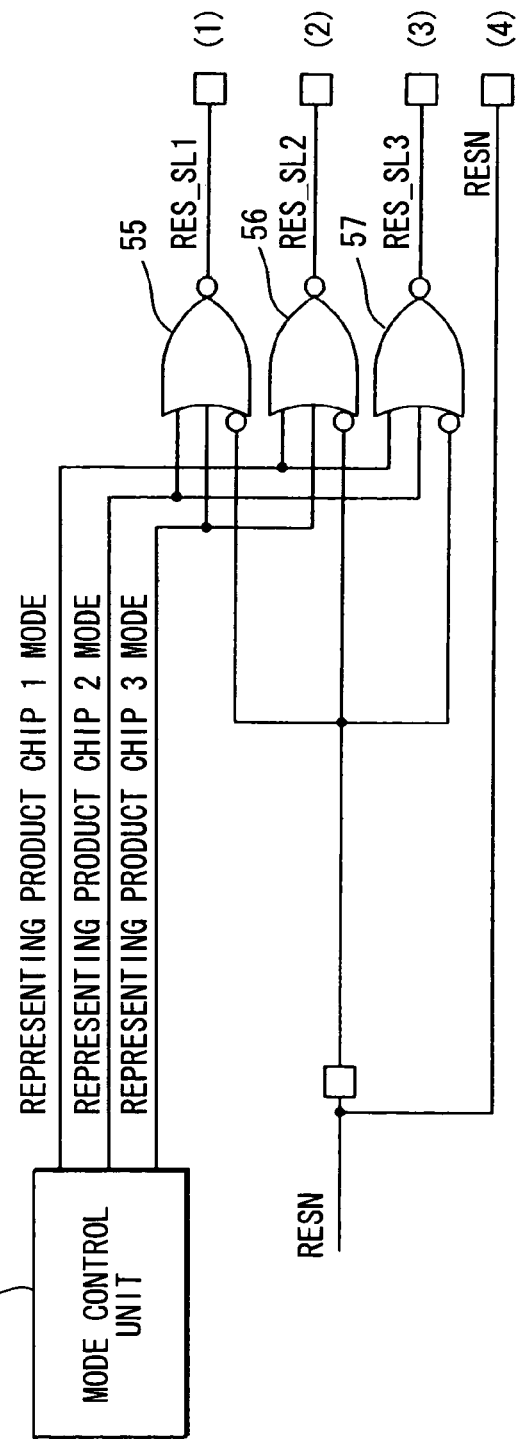
FIG. 11A shows a configuration for controlling internal reset in a case where a microcomputer chip is set to an ICE mode.
FIG. 11B is a table for explanation of functions XIA to XID in FIG. 11A.
Figure 12:
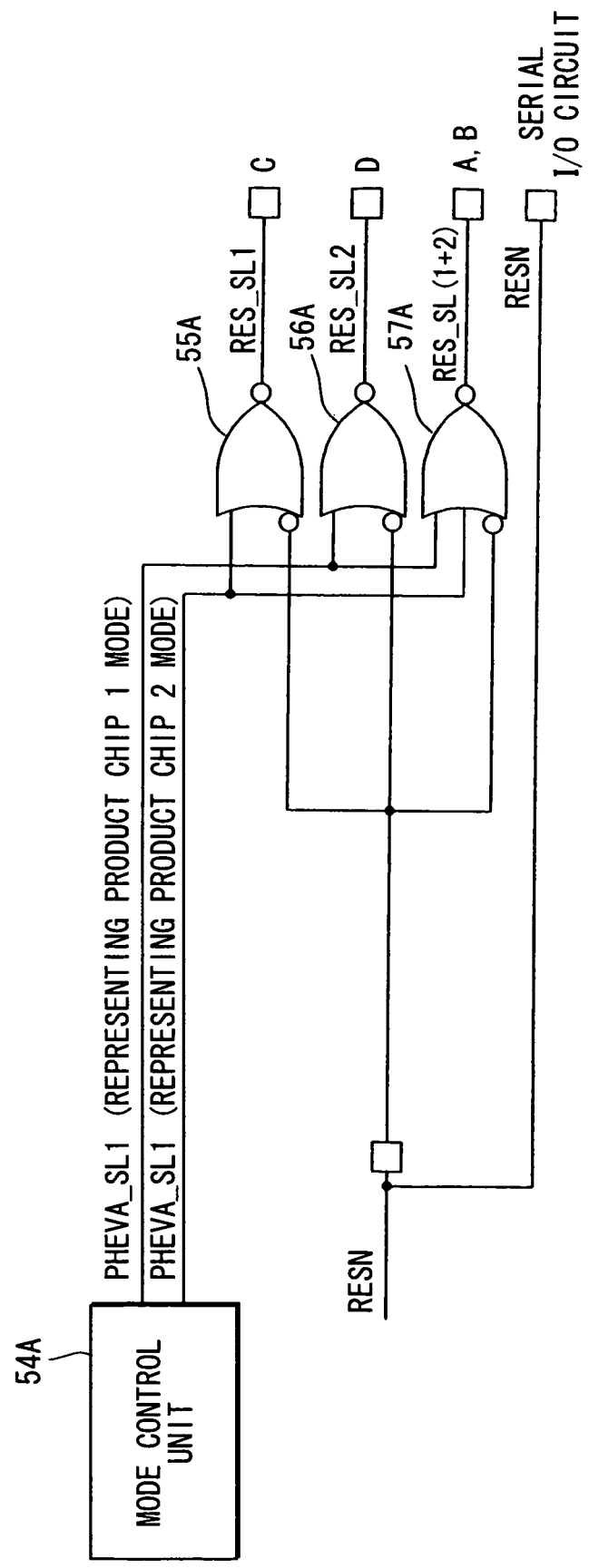
FIG. 12 is an equivalent diagram of FIG. 11 adapted to the configuration of FIG. 10.

FIG. 10 to FIG. 12 show a third embodiment. The third embodiment also relates to the configuration of an EVA chip and is concerned with a case where an extensional configuration is adopted with the standard chip 24 and microcomputer chip 1 of the second embodiment used as fundamental components. An EVA chip 51 includes a standard chip (ICE-adaptive chip) 52 and two microcomputer chips 53A and 53B. The chips are, similarly to those of the second embodiment, interconnected through four kinds of terminals (MD terminals and RESN terminals are not shown). The standard chip 52 includes two data input/output terminals DIO1 and DIO2. The DIO1 terminal is connected to the DIO terminal of the microcomputer chip 53A, and the DIO2 terminal is connected to the DIO terminal of the microcomputer chip 53B.

Moreover, as the standard chip of the second embodiment includes the peripheral functional unit 38, so the standard chip 52 includes functional units A and B (logic circuit units or the like) identical to functional units A and B included in the microcomputers 53. The functions of the functional units can be checked on the standard chip 52 side. Functional units C and D (power-system functional units) are included only in the microcomputer chips 53, and the functions thereof are therefore checked on the microcomputer chips 53 side.

In this case, on the microcomputer chip 53A side, the functional unit C alone is allowed to operate. On the microcomputer chip 53B side, the functional unit D alone is allowed to operate. The standard chip 52 can simultaneously output test data items through the DIO1 terminal and DIO2 terminal thereof respectively so as to concurrently operate the functional units C and D.

On the microcomputer chips 53 side, the functional units A and B need not be operated in an ICE mode. Consequently, when the microcomputer chips 53 operate in a user mode, the DCK terminals and DIO terminals can be used in common with terminals which the functional units A and B use as external terminals. In FIG. 10, the functional units of the microcomputer chips 53 that are stopped in the ICE mode are hatched in the same manner as those in the second embodiment.

FIGS. 11A and 11B show a configuration (a generalized one unlike the configuration shown in FIG. 10) for resetting and controlling the components of the microcomputers 53 while setting the microcomputer chips 53 to an ICE mode as shown in FIG. 10. For setting the microcomputer chips 53 to the ICE mode, the standard chip 52 sets the microcomputer chips 53A and 53B to independent modes, that is, a product chip 1 mode and a product chip 2 mode, respectively.

Each of mode control units 54 of the microcomputer chips 53 decodes the result of the setting and outputs a decoded signal. The decoded signal is outputted to each of NOR gates 55 to 57. During operation in an ICE mode, the mode control unit 54 outputs a signal representing any of modes 1 to 3 as a product chip mode. A reset signal RESN is active low. In this case, the NOR gates 55 to 57 each have three input terminals. To negative-true logic input terminals among them, the reset signal RESN is applied in common.

Decoded signals representing a product chip 2 mode and a product chip 3 mode are fed to the NOR gate 55, decoded signals representing a product chip 1 mode and the product chip 3 mode are fed to the NOR gate 56, and decoded signals representing the product chip 1 mode and the product chip 2 mode are fed to the NOR gate 57. The NOR gates 55, 56, and 57 output reset signals RESN-SL1, SL2, and SL3 respectively associated with the product chips 1, 2, and 3. Inside each of the microcomputer chips 53, the reset signals are allocated to the functional units as mentioned below.

Reset signal RESN-SL1: allocated to functional units that operate in the product chip 1 alone (do not operate in the product chips 2 and 3)

Reset signal RESN-SL2: allocated to functional units that operate in the product chip 2 alone (do not operate in the product chips 1 and 3)

Reset signal RESN-SL3: allocated to functional units that operate in the product chip 3 alone (do not operate in the product chips 1 and 2)

The reset signal RESN is outputted to functional units that operate in all the modes.

FIG. 12 shows a case in which the configuration shown in FIG. 11A is adapted to the configuration shown in FIG. 10. The microcomputer chips 53A and 53B are set to the product chip 1 mode and product chip 2 mode respectively. The reset signal RESN-SL1 is fed to the functional units C, the reset signal RESN-SL2 is fed to the functional units D, the reset signal RESN-SL(1+2) is fed to the functional units A and B, and the reset signal RESN is fed to the serial input/output circuit 6.

As mentioned above, according to the third embodiment, the EVA chip 51 includes two microcomputer chips 53. The data terminals of the microcomputer chips 53A and 53B are connected to the different data terminals of the standard chip 52. When the standard chip 53 sets the microcomputer chips 53A and 53B to the different ICE modes, the microcomputer chips 53A and 53B each operate the functional units alone associated with the ICE mode designated for each microcomputer chip. When the standard chip 52 simultaneously inputs or outputs different functional evaluation data items through the multiple data terminals thereof, the different facilities of the microcomputer chips 53A and 53B respectively can be simultaneously operated. The number of data terminals needed per one microcomputer chip 53 can be decreased.

The microcomputer chips 53A and 53B each logically synthesize decoded signals representing ICE modes with reset signals outputted from the standard chip 52, and thus cancel only a reset signal that is fed to the functional units which each microcomputer chip has to operate in the ICE mode designated for each microcomputer chip. Thus, only the necessary functional units can be operated by controlling reset.

Fourth Embodiment

FIG. 13A to FIG. 15D show a fourth embodiment. Only a portion different from that of the first embodiment will be described below. In the fourth embodiment, one of operating modes of a microcomputer 61, for example, a mode 2 is defined as a reference mode (i.e., R MODE). What is referred to as the reference mode is a mode in which when a mode decoder 8 decodes data of the mode 2, the level of a specific output terminal of the microcomputer 61 is changed from a low level to a high level.

The reference mode is included with the intention described below. When the operating modes of a microcomputer can be, as those of the microcomputer, switched, assuming that the microcomputer is set to one of multiple test modes and then evaluated, if the result of the evaluation demonstrates that an operational abnormality occurs, whether the cause lies in incorrect designation of an operating mode or in a malfunction derived from noise or the like or an error in control of a test itself has to be discriminated.

For this purpose, which of the operating modes of a microcomputer is currently designated has to be checked. In the case of a microcomputer in which there is room for an increase in the number of external terminals, count data of a mode counter 7 and a result of decoding by the mode decoder 8 can be outputted through the external terminals via a register. However, in a microcomputer in which the number of external terminals cannot be increased due to restrictions imposed on a package size and a cost, the data items cannot be outputted in the above form. It is therefore hard to check the operating mode.

In the microcomputer 61 of the fourth embodiment, transitions among the operating modes are made circulatory along with the counting operation of the mode counter 7 initiated by a change in a signal applied to a mode terminal.

Therefore, once a transition to the reference mode is recognized with a change in the level at a specific output terminal, an operating mode can be identified through relative comparison with the reference mode.

For example, as shown in FIG. 14, assume that when the operating mode of the microcomputer 61 makes circulatory transitions from a test mode 1 to a test mode 7 with a user mode and the reference mode among them, the microcomputer 61 is evaluated in the test mode 5. For verifying whether the operating mode at the time of the evaluation is the test mode 5, assuming that after transitions are made among five modes from that time, the level at the specific output terminal is changed from one to another and a transition to the reference mode is made, the operating mode at the time of the evaluation is found to be the test mode 5.

FIGS. 15A to 15D show the configurations for changing the level at the specific output terminal at the time of a transition to the reference mode. FIGS. 15A and 15b are concerned with a case where logic circuits are used for the configuration. The configuration includes two AND gates 62 and 63 and an OR gate 64 that outputs an OR of the outputs of the AND gates. The output terminal of the AND gate 11 shown in FIG. 13 through which data representing the reference mode is outputted is connected to one input terminals E of the AND gates 62 and 63 (negative-true logic) respectively. The other input terminal of the AND gate 62 serves as a terminal A for a high-level output representing the reference mode, and the other input terminal of the AND gate 63 serves as a general-purpose signal output terminal B and is set to a low level by default. Consequently, when a transition is made to the reference mode, the input terminal A of the AND gate 62 is selected. In any other operating mode, the input terminal B of the AND gate 63 is selected.

FIGS. 15C and 15D are concerned with a case where analog switches are used for the configuration. The input sides of analog switches 65 and 66 whose output sides are connected in common are a terminal A for a high-level output representing the reference mode, and an output terminal B for a general-purpose signal that is set to a low level by default. The output terminal of the AND gate 11 is connected to each of an NMOS gate of the analog switch 65 and a PMOS gate of the analog switch 66, and is also connected to each of a PMOS gate of the analog switch 65 and an NMOS gate of the analog switch 66 via a NOT gate 67. Consequently, when a transition is made to the reference mode, the terminal A of the analog switch 65 is selected. In any other operating mode, the terminal B of the analog switch 66 is selected.

According to the fourth embodiment, as mentioned above, since multiple operating modes include one or more reference modes in which the output state of an external terminal is changed from one to another simultaneously with designation of the reference mode, the fact that a current operating mode is the reference mode can be externally readily verified. If an operational abnormality occurs during evaluation of the microcomputer 61, if only the number of state transitions made from an operating mode at that time to the reference mode is checked, whether there is an error in the transitions among the operating modes can be determined. Moreover, when a transition is made to the reference mode, the microcomputer 61 changes the signal level at the external terminal from one to another. Therefore, the addition of a very simple hardware configuration makes it possible to identify the reference mode.

Fifth Embodiment

Figure 16:
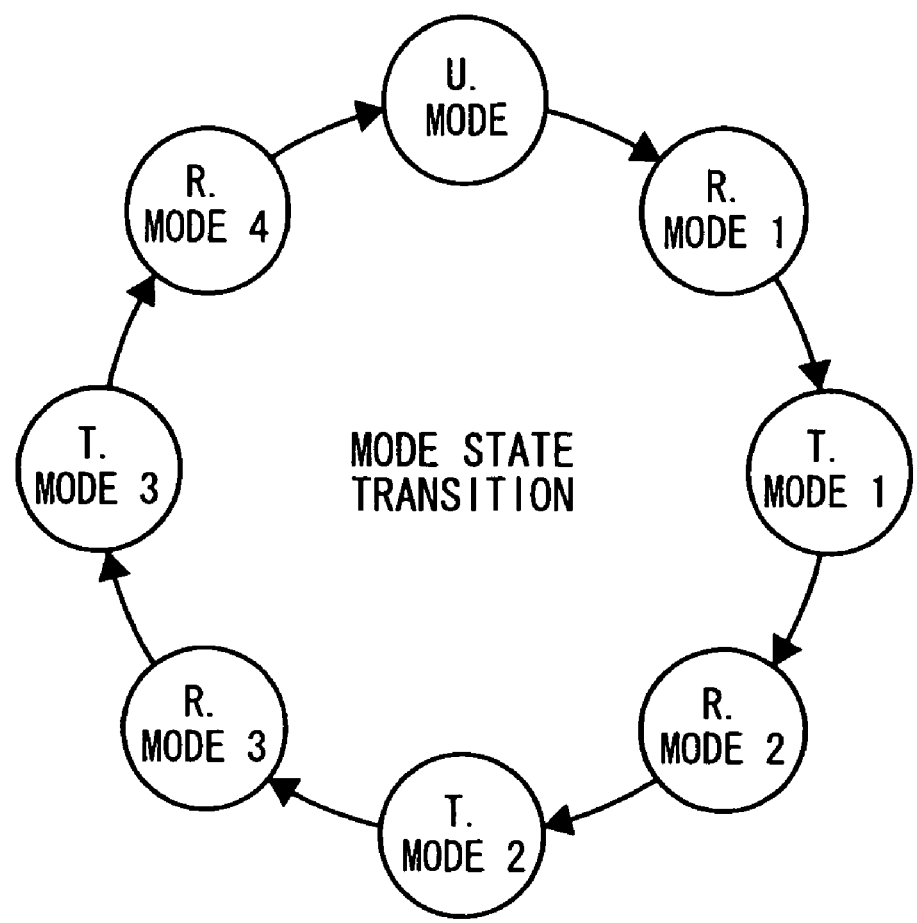
FIG. 16 is an equivalent diagram of FIG. 14, according to a fifth embodiment.
Figure 17:
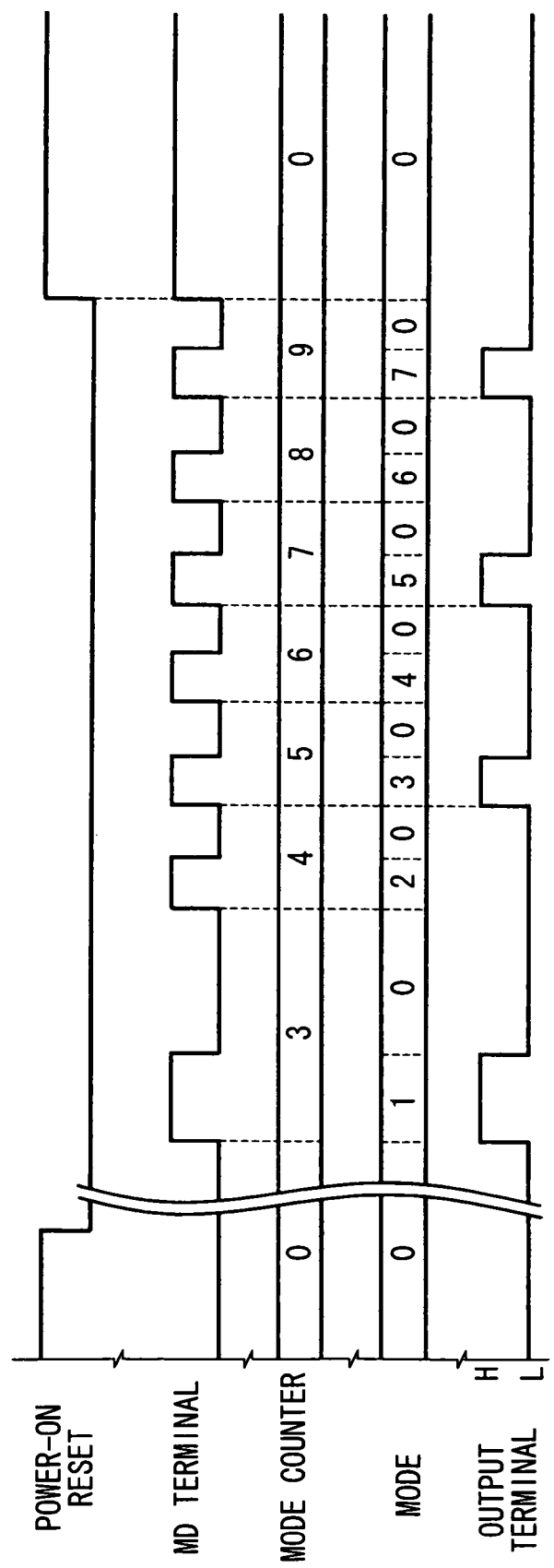
FIG. 17 is an equivalent diagram of FIG. 13B.

FIG. 16 and FIG. 17 show a fifth embodiment. Only a portion which is different from that of the fourth embodiment will be described below. As shown in FIG. 16, in the fifth embodiment, reference modes are specified at every other position among a user mode and test modes. Consequently, as shown in FIG. 17, in modes 1, 3, 5, and 7 in which the mode counter 7 indicates 3, 5, 7, and 9 respectively, the level at a specific output terminal is changed to a high level. In this case, in the circuit shown in FIG. 15, OR gates are disposed in a stage preceding the input terminals E, and a decoded signal representing the reference mode is applied to the input terminals of the OR gates via the AND gate 11 or the like.

According to the fifth embodiment having the foregoing configuration, since the reference modes are specified at every other position in a circulatory loop of mode transitions, the fact that a transition is made to the reference mode can be more readily verified.

Sixth Embodiment

Figure 18:
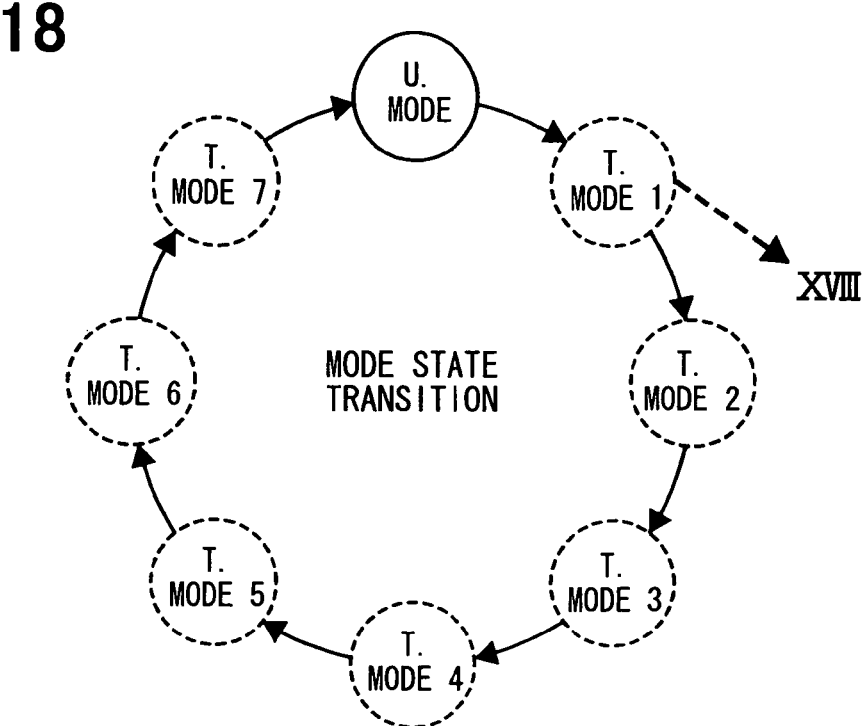
FIG. 18 is an equivalent diagram of FIG. 14, according to a sixth embodiment.

FIG. 18 shows a sixth embodiment. In the sixth embodiment, unlike the fourth and fifth embodiments, an operating mode equivalent to the reference mode is not defined. Instead, when a transition is made from an operating mode to a test mode, a signal signifying what mode the current mode is produced by changing the signal output state of an external terminal from one to another. FIG. 18 conceptually shows this process. Here, XVIII represents that, in each mode, the following output is outputted by using a terminal. The output is a serial output for communication, a PWM for a frequency and a duty factor, a voltage value output for a digital-analog converting, a current value output, and/or a smoothed value concerning an output wave.

For example, when a test mode 1 is designated, a specific test command is issued in order to change a data value, which is outputted through the DIO terminal shown in FIG. 1 and serially communicated, from one to another, change the duty factor of a pulse-width modulated (PWM) signal or the carrier frequency thereof from one to another, change an output voltage of a D/A converter from one to another, change an output current value from one to another, or change the rise time or fall time (smoothed value) of an output wave from one to another. The state of the change is observed outside the microcomputer in order to specify what operating mode is currently designated.

Incidentally, as a terminal through which a signal is outputted in order to identify a kind of mode, an external terminal that is unused or used less frequently for evaluation of a microcomputer in a designated test mode is selected.

According to the sixth embodiment having the foregoing configuration, when a microcomputer is set to a test mode, the output state of an external terminal is changed from one to another so that an operating mode currently designated in response to an externally fed instruction can be externally identified. The operating mode can be identified by observing the state of the change, and whether there is an error in transitions of operating modes can be determined.

Seventh Embodiment

Figure 19:
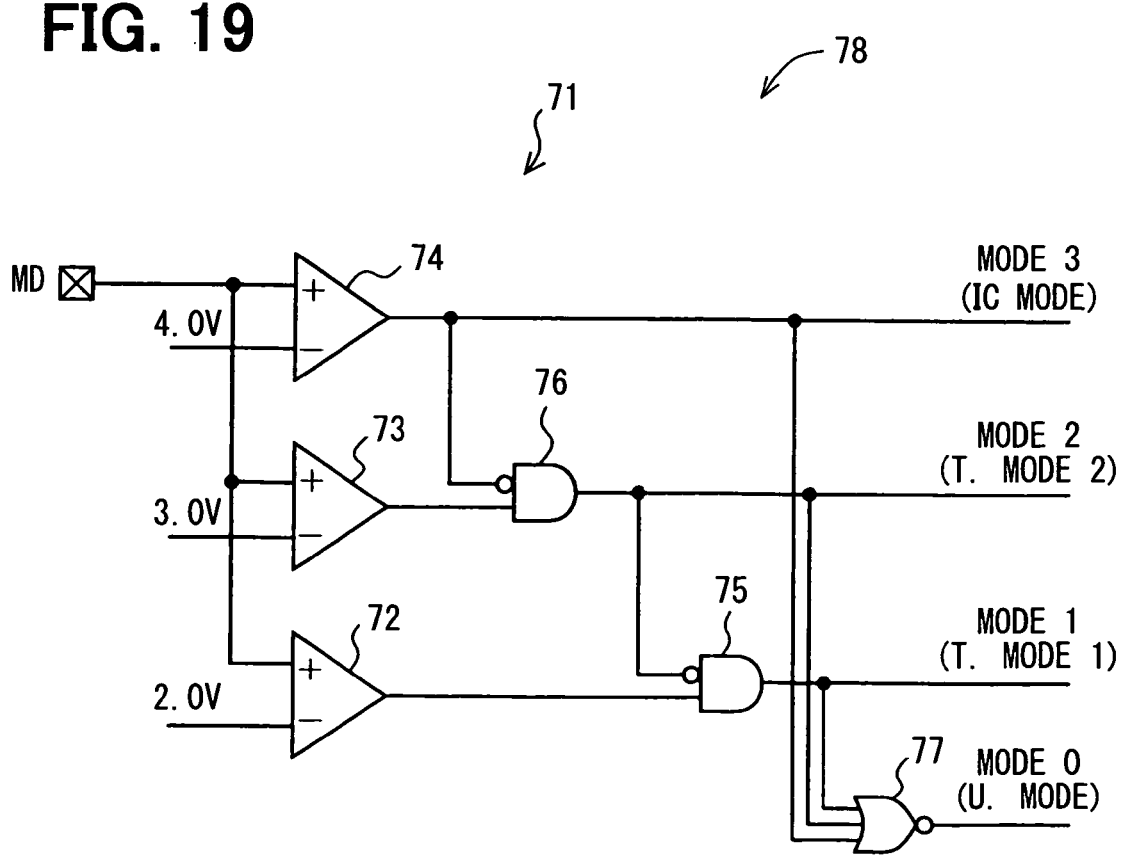
FIG. 19 is an equivalent diagram of FIG. 2A, according to a seventh embodiment.

FIG. 19 is concerned with a seventh embodiment and shows another example of the configuration of a mode control unit. A mode control unit (mode signal output unit) 71 includes three comparators 72 to 74, AND gates 75 and 76, and a NOR gate 77. A mode terminal MD is connected in common to the non-inverting input terminals of the comparators 72 to 74, and reference voltages of 2.0 V, 3.0 V, and 4.0 V are applied to the respective non-inverting input terminals. The reference voltages are produced as fractions of a supply voltage using resistors.

The output terminals of the comparators 72 and 73 are connected to one input terminals of the respective AND gates 75 and 76. A mode signal MODE 3 representing an ICE mode is outputted directly through the output terminal of the comparator 74, and the mode signal is applied to the other negative-true logic input terminal of the AND gate 76. Moreover, a mode signal MODE 2 representing a test mode 2 is outputted through the output terminal of the AND gate 76, and the mode signal is applied to the other negative-true logic input terminal of the AND gate 75.

A mode signal MODE 1 representing a test mode 1 is outputted through the output terminal of the AND gate 75. The output terminals of the comparator 74 and AND gates 76 and 75 are connected to the input terminals of the three-input NOR gate 77, and a mode signal MDOE 0 representing a user mode is outputted through the output terminal of the NOR gate 77. A microcomputer 78 includes the mode control unit 71 having the foregoing configuration.

Next, the operation of the seventh embodiment will be described. Since the mode control unit 71 has the foregoing configuration, the relationship between the voltage level $V_{MD}$ of a mode designation signal to be applied to the mode terminal MD and the operating mode of the microcomputer 78 is established as mentioned below.

| | |
|---|---|
| 0 V ≦ $V_{MD}$ < 2.0 V | mode 0 (user mode) |
| 2.0 V ≦ $V_{MD}$ < 3.0 V | mode 1 (test mode 1) |
| 3.0 V ≦ $V_{MD}$ < 4.0 V | mode 2 (test mode 2) |
| 4.0 V ≦ $V_{MD}$ < 5.0 V | mode 3 (ICE mode) |

Incidentally, the upper limit of the voltage level $V_{MD}$ associated with the mode 3 is concerned with a case where the supply voltage is 5.0 V.

Specifically, in the mode 0, the output signals of the comparators 72 to 74 all exhibit a low level, and the output signal of the NOR gate 77 alone exhibits a high level. In the mode 1, the output signal of the comparator 72 alone exhibits the high level, and the output signal of the AND gate 75 alone exhibits the high level. In the mode 2, the output signals of the comparators 72 and 73 exhibit the high level, and the output signal of the AND gate 76 alone exhibits the high level. In the mode 3, the output signals of the comparators 72 to 74 all exhibit the high level, and the output signal of the comparator 74 serves as a mode signal. Consequently, the number of comparators included in the mode control unit is a value obtained by subtracting 1 from the number of designated modes. The operations of the microcomputer 78 in the respective modes are identical to those in the first to sixth embodiments.

Now, the width of a voltage range associated with a user mode is 2.0 V or larger than the width of 1.0 V of voltage ranges associated with the other operating modes. In other words, when the microcomputer 78 is set to the user mode and operated, the operating state should preferably be stabilized to the greatest possible extent. Therefore, the width of the voltage range associated with the user mode is designated larger in order to minimize the possibility that during operation in the user mode, the microcomputer may make a transition to any other operating mode because, for example, noise is applied to the mode designation terminal MD. Moreover, from the above viewpoint, when the microcomputer 78 is operated in the user mode, the mode designation terminal MD should preferably be fixed to a ground level. The mode designation terminal may be used in common with the other terminals of the microcomputer 78 which are set to the ground level for use.

As mentioned above, according to the seventh embodiment, the mode control unit 71 outputs a mode signal according to the level of a mode designation signal to be applied to the mode designation terminal MD. Consequently, the microcomputer 78 can be set to a larger number of operating modes according to a change in a signal level. The same advantage as that of the first embodiment can be provided. Moreover, the mode control unit 71 assigns predetermined voltage ranges to the levels of the mode designation signal associated with respective operating modes. Consequently, designation of an operating mode with the mode designation signal fed externally of the microcomputer 78 can be achieved more readily.

Moreover, the mode control unit 71 designates the voltage range associated with a user mode so that the width of the voltage range will be larger than the width of the voltage ranges associated with the other operating modes. The possibility that the microcomputer 78 may make a transition to any other operating mode during operation in the user mode can be minimized.

Further, the mode control unit 71 sets the voltage range associated with the user mode to a range on a side including a ground level. The lower limit of the voltage range is therefore a level that can be readily stably designated. Once the mode designation terminal is set to the ground level, a user-mode designated state can be stabilized.

In addition, the mode designation terminal MD is used in common with a terminal that is used while being fixed to a ground level falling within the voltage range associated with the user mode. Therefore, a terminal used to designate a level for the purpose of operating the microcomputer 78 in the user mode need not be additionally included. An increase in the number of terminals can be further suppressed.

The present invention is not limited to the aforesaid embodiments shown in the drawings, but can be varied or extended as described below.

The configuration of the mode control unit included in the first embodiment is not limited to the one shown in FIG. 2A. As for the user mode (mode 0), only when the level of the mode designation signal exhibits a low level, the user mode may be designated irrespective of the result of output from the mode decoder 8.

Moreover, the level at which the user mode is designated may be high. In this case, for example, an ADref terminal that is a terminal through which a reference voltage for A/D conversion is fed to an A/D converter included in the microcomputer 1, and the MD terminal may be used in common with each other.

The adder 7b can merely change the state thereof from one to another along with an input through the MD terminal, and may count up at every leading edge. Moreover, a subtractor or a Gray-code counter may do.

The memory map of FIG. 3D in a test mode may be defined if necessary. Moreover, only one memory map may be defined in association with a test mode.

In the second embodiment, transmission and reception of serial data need not always be assigned to two channels.

The number of data bits to be handled by the microcomputer may be appropriately modified according to an individual design.

In the third embodiment, the number of microcomputer chips 53 may be 3 or more.

In the fourth embodiment, the reference mode need not always be defined as the mode 2.

In the fourth and fifth embodiments, a change in an output level occurring when a transition is made to the reference mode may be defined by default as a change from a high level to a low level. As presented in the sixth embodiment, the output voltage of the D/A converter may be varied or the output current value may be varied.

In the fifth embodiment, when multiple reference modes are specified, they need not always be specified at every other position but may be specified every third position or the like.

In the sixth embodiment, similarly to the fourth embodiment, the signal level at an external terminal may be changed from one to another.

In the fourth to sixth embodiments, the output states of two or more external terminals may be changed from one to another.

The microcomputers of the fourth to sixth embodiments may be provided in the form of a microcomputer chip. An EVA chip may be configured in the same manner as those in the second and third embodiment.

When only a functional unit that must be operated in the ICE mode is selectively operated, powering may be independently controlled.

In the seventh embodiment, voltage ranges associated with respective operating modes may be modified appropriately. Moreover, when designation of the voltage of an externally fed mode designation signal can be accurately controlled, the operating modes may be associated with predetermined voltages.

In the seventh embodiment, the voltage range associated with the user mode may be set to a range on a side including a power level, for example, a range from 3.0 V to 5.0 V.

Moreover, the width of the voltage range associated with the user mode may be set to the same width as the width of the voltage ranges associated with the other operating modes. Further, the voltage ranges may be designated so that the widths thereof may be different from one another. An insensitive band may be defined between adjoining ones of the voltage ranges.

The above disclosure has the following aspects.

According to a first aspect of the present disclosure, a microcomputer for functioning according to a plurality of operation modes includes: a mode counter that counts the number of times of level change in a signal applied to a mode setting terminal; a mode decoder that decodes output data of the mode counter so as to output a mode signal, wherein the mode signal represents one of the operation modes; a clock input terminal; a data terminal through which serial data is inputted synchronously with a serial clock signal applied to the clock input terminal; a serial-to-parallel conversion unit that converts the serial data into parallel data and stores the parallel data in an input data buffer; and a switching means that switches to a state that a CPU is capable of accessing to the input data buffer when the mode signal represents a test mode. In the test mode, test instruction data is capable of being inputted from an external circuit.

According to the above microcomputer, a mode decoder decodes output data of a mode counter that counts the number of times of a change in a signal level to be applied to a mode designation terminal, and outputs a mode signal. Consequently, a larger number of operating modes of a microcomputer can be designated for the microcomputer according to the number of times of a change in the signal level. When the mode signal represents a test mode, a switching means performs switching so that access to an input data buffer gained by a CPU will be permitted. Externally inputted serial data is stored in the input data butter via a serial-to-parallel conversion unit. Consequently, test instruction data can be externally serially inputted and executed by the CPU. While an increase in the number of terminals is suppressed to a greatest possible extent, the microcomputer can be tested.

Alternatively, the serial-to-parallel conversion unit may include an output data buffer that stores data outputted from the CPU to a data bus when the test instruction data provides a data output instruction to the external circuit. The serial-to-parallel conversion unit serially converts the data stored in the output data buffer; and the serial-to-parallel conversion unit is capable of outputting a converted data to the external circuit through the data terminal. In this case, when a test instruction is a data output instruction for outside, a serial-to-parallel conversion unit serially converts data, which is outputted onto a data bus by a CPU and stored in an output data buffer, so that the data can be outputted to outside. Consequently, during a test, an internal data value can be serially outputted and monitored outside.

Alternatively, when a level of the signal at the mode setting terminal is one of a high level and a low level, the mode decoder may perform a decoding operation in accordance with a count value of the mode counter; and when the level of the signal at the mode setting terminal is the other one of the high level and the low level, the mode decoder may decode a signal representing a user mode irrespective of the count value of the mode counter. In this case, when the level at a mode designation terminal is one of a high level and a low level, a mode decoder performs a decoding operation according to a count value of a mode counter. When the mode designation terminal exhibits the other level, the mode decoder decodes data representing a user mode. When only a case where the microcomputer is operated in the user mode takes place in, for example, a field, once the mode designation terminal is fixed to the other level, the possibility that the microcomputer may malfunction in any other mode can be eliminated. Furthermore, the mode setting terminal may be common with a terminal that fixes an input signal level while operating in the user mode to a level at which the mode decoder decodes the signal representing the user mode. In this case, a mode designation terminal is used in common with a terminal to be used while having an input signal level thereat fixed to a level, at which a mode decoder decodes data representing a user mode, during operation in a user mode. Consequently, a terminal through which the signal level is set for the purpose of operating the microcomputer in the user mode need not be included additionally. An increase in the number of terminals can be further suppressed.

Alternatively, the CPU may access a program memory while operating in the user mode; and even when the mode signal represents a test mode, the switching means may be capable of performing selection of a state that the CPU access to the program memory. In this case, a switching means is designed so that even when a mode signal represents a test mode, the switching means can perform selection so that access to a program memory, which a CPU accesses during operation in a user mode, gained by the CPU will be permitted. Consequently, even in the test mode, similarly to the user mode, the microcomputer can be operated based on a program read from the program memory. Furthermore, the switching means may include a setting register for performing the selection of the state; and the switching means performs the selection according to a data value set in the designation register via the serial-to-parallel conversion unit. In this case, a switching means performs selection according to a data value specified in a designation register via a serial-to-parallel conversion unit. Objects of access can be readily switched externally.

Alternatively, the microcomputer may further include: an external terminal that is unused or used less frequently in the test mode. When the mode signal represents a test mode, an output state of the external terminal is changed from one to another so that an operating mode currently set in accordance with an instruction inputted from the external circuit can be identified by the external circuit. In this case, when a mode signal represents a test mode, the output state of an external terminal which is unused in the test mode or whose use frequency in the test mode is low is changed from one to another so that an operating mode currently designated according to an externally fed instruction can be externally identified. Specifically, when functional evaluation is performed with the microcomputer set to the test mode, if an operational abnormality occurs, whether the cause lies in an operating mode transition error, a malfunction affected by noise or the like, or an error in control itself during a test cannot be discriminated. Therefore, when a predetermined instruction is externally fed, the output state of the external terminal is changed from one to another. If a current operating mode can be identified based on the manner of the change, whether there is an error in transitions among operating modes can be determined.

Alternatively, the microcomputer may further include: an external terminal that is unused or used less frequently in the test mode. The plurality of operating modes includes one or more reference modes; and each reference mode provides to change an output state of the external terminal from one to another at a time when the reference mode is set. In this case, multiple operating modes include one or more reference modes in which the output state of an external terminal is changed from one to another simultaneously with designation of the reference mode. Consequently, the fact that a current operating mode is the reference mode can be externally readily verified. Assuming that the problem described in relation to the above is coped with, if an operational abnormality occurs, whether there is an error in transitions among the operating modes can be determined by checking the number of state transitions made from the operating mode at that time to the reference mode.

Alternatively, a level of the signal may be changed so that the output state of the external terminal is changed from one to another. In this case, when the output state of an external terminal is changed from one to another, signal levels are changed. Consequently, the fact that a reference mode is designated can be verified merely by adding a very simple hardware configuration.

According to a second aspect of the present disclosure, a microcomputer for functioning based on a plurality of operation modes includes: a mode signal output unit that outputs a mode signal in accordance with a level of a mode setting signal applied to a mode setting terminal, wherein the mode signal represents one of the operation modes; a clock input terminal; a data terminal through which serial data is inputted synchronously with a serial clock signal applied to the clock input terminal; a serial-to-parallel conversion unit that converts the serial data into parallel data and stores the parallel data in an input data buffer; and a switching means that switches to a state that a CPU is capable of accessing to the input data buffer when the mode signal represents a test mode. In the test mode, test instruction data is capable of being inputted from an external circuit.

According to the above microcomputer, a mode signal output unit outputs a mode signal according to the level of a mode designation signal to be applied to a mode designation terminal. Consequently, a larger number of operating modes can be designated for the microcomputer according to a change in the signal level. When the mode signal represents a test mode, a switching means performs switching so that access to an input data buffer gained by a CPU will be permitted. Externally inputted serial data is then stored in the input data buffer via a serial-to-parallel conversion unit. Consequently, test instruction data can be externally serially inputted and executed by the CPU. An increase in the number of terminals can be suppressed to the greatest possible extent, and the microcomputer can be tested.

Alternatively, the mode signal output unit may set a width of a voltage range corresponding to a user mode to be larger than a width of a voltage range corresponding to other operating mode. In this case, a mode signal output unit designates the width of a voltage range associated with a user mode so that the width will be larger than the width of voltage ranges associated with the other operating modes. Specifically, when the microcomputer is set to and operated in the user mode, the operating state should preferably be stabilized as greatly as possible. Consequently, when the width of the voltage range associated with the user mode is designated to be larger, the possibility that a transition to any other operating mode may be made during operation in the user mode can be minimized.

Alternatively, the mode signal output unit may set the voltage range corresponding to the user mode to be disposed on a side including a power level or a side including a ground level. In this case, a mode signal output unit sets a voltage range associated with a user mode to a range either on a side including a power level or on a side including a ground level. Specifically, the upper and lower limits of each of the voltage ranges including the power level and ground level respectively are levels that can be stably readily designated. Once a mode designation terminal is set to the power level or ground level, a user-mode designated state can be stabilized.

Alternatively, the mode setting terminal commonly may provide a terminal that is fixed to a potential in the voltage range corresponding to the user mode. In this case, a mode designation terminal is used in common with a terminal to be used while being fixed to a potential falling within a voltage range associated with a user mode. Consequently, a terminal to be used to designate a level for the purpose of operating the microcomputer in the user mode need not be additionally included. An increase in the number of terminal can be further suppressed.

According to a third aspect of the present disclosure, a functional evaluation chip for evaluating function of a microcomputer and for debugging software in the microcomputer, the chip includes: the microcomputer according to the first aspect of the present disclosure; and an ICE-adaptive chip having a same function as a part of the function of the microcomputer and including a first connection interface for connecting to an in-circuit emulator. The ICE-adaptive chip is coupled with the microcomputer through a second connection interface. The second connection interface includes the mode setting terminal, a reset signal input terminal, the clock input terminal, and the data terminal; and the ICE-adaptive chip sets the microcomputer to an ICE mode so that a date is inputted to and outputted from the data terminal, the data for evaluating function of the microcomputer and for debugging software in the microcomputer.

According to the above functional evaluation chip, the functional evaluation chip includes a chip of a microcomputer set forth in the first or second aspect of the present disclosure (microcomputer chip), and an ICE-adaptive chip that includes the same functions as part of the functions of the microcomputer and a connection interface for an in-circuit emulator (ICE), and performs functional evaluation/software debugging on the microcomputer. The ICE-adaptive chip has a mode designation terminal, a reset signal input terminal, a clock input terminal, and a data terminal thereof connected to the counterparts of the microcomputer chip, sets the microcomputer chip to an ICE mode, and inputs or outputs data for a functional evaluation/software debugging operation through the data terminal.

As a conventional technology relating the foregoing functional evaluation chip, for example, there is one described in IP-A-2002-175196. A configuration disclosed in the publication fundamentally has a product chip of a microcomputer and an ICE-adaptive chip connected to each other. However, the number of kinds of connection terminals between the chips is so large as to be about several tens of connection terminals. Moreover, a dedicated circuit for controlling the ICE-adaptive chip and a signal interface has to be included in the functional evaluation chip.

In contrast, according to the functional evaluation chip of the present invention, the number of kinds of terminals through which the chips are connected to each other is only four or the same as that in the sole unit of the microcomputer chip. Consequently, the functional evaluation chip can be configured to be a small size at a low cost.

Alternatively, when the microcomputer is set to the ICE mode, a part of the microcomputer corresponding to function mounted on an ICE-adaptive chip side may stop functioning. In this case, when a microcomputer chip is set to an ICE mode, components corresponding to facilities mounted in an ICE-adaptive chip are stopped. Specifically, when a microcomputer chip that is a product is used to configure a functional evaluation chip, facilities corresponding to functional parts that logically operate in the microcomputer chip can be included in the ICE-adaptive chip. Therefore, the facilities in the ICE-adaptive chip are evaluated.

When the microcomputer chip includes a power-system functional part (for example, a driver or the like), which operates at a higher voltage, in addition to logic circuits, if a facility corresponding to the functional part cannot be configured in the ICE-adaptive chip, the functional part configured in the microcomputer chip is directly evaluated. In this case, on the microcomputer chip side, since the other functional parts (whose corresponding facilities are included in the ICE-adaptive chip) need not be operated, they are stopped. Thus, functional evaluation on the microcomputer chip side can be readily performed.

Alternatively, the functional evaluation chip may further include: a second microcomputer according to the first aspect of the present disclosure. The ICE-adaptive chip further includes first and second data terminals. The first data terminal is coupled with the microcomputer, and the second data terminal is coupled with the second microcomputer. The ICE-adaptive chip is capable of inputting and outputting a first data through the first data terminal together with inputting and outputting a second data through the second data terminal. The data terminal in the microcomputer is coupled with the first data terminal in the ICE-adaptive chip, and a data terminal in the second microcomputer is coupled with the second data terminal in the ICE-adaptive chip. The ICE-adaptive chip is capable of setting the microcomputer to a first ICE mode together with setting the second microcomputer to a second ICE mode. When the microcomputer is set to the first ICE mode, the microcomputer operates only function corresponding to the first ICE mode; and when the second microcomputer is set to the second ICE mode, the second microcomputer operates only function corresponding to the second ICE mode. In this case, multiple microcomputer chips are included, and the data terminals of the microcomputer chips are connected to multiple different data terminals of an ICE-adaptive chip. When the ICE-adaptive chip sets the multiple microcomputer chips to different ICE modes, the microcomputer chips allow only functional units thereof, which are associated with the designated ICE modes thereof, to operate. Owing to this configuration, since the ICE-adaptive chip simultaneously inputs or outputs different functional evaluation data items through the multiple data terminals, the multiple microcomputer chips can allow different facilities thereof to simultaneously operate. The number of necessary data terminals per a microcomputer chip can be decreased.

Alternatively, each microcomputer may logically synthesize a decoded signal corresponding to the ICE mode with a reset signal so that the reset signal is divided into a plurality of channel signals. The microcomputer cancels one channel signal corresponding to the first ICE mode so that the microcomputer operates only the function corresponding to the first ICE mode; and the second microcomputer cancels one channel signal corresponding to the second ICE mode so that the second microcomputer operates only the function corresponding to the second ICE mode. In this case, each of multiple microcomputer chips logically synthesizes a decoded signal representing an ICE mode with a reset signal outputted from an ICE-adaptive chip so as to cancel only the reset signal to be fed to a functional unit which each microcomputer chip should allow to operate according to its ICE mode. Consequently, the multiple microcomputer chips can allow only the necessary functional units thereof to operate by controlling reset.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A microcomputer for functioning according to a plurality of operation modes comprising;
   a mode counter that counts the number of times of level change in a signal applied to a mode setting terminal;
   a mode decoder that decodes output data of the mode counter so as to output a mode signal, wherein the mode signal represents one of the operation modes;
   a clock input terminal;
   a data terminal through which serial data is inputted synchronously with a serial clock signal applied to the clock input terminal;
   a serial-to-parallel conversion unit that converts the serial data into parallel data and stores the parallel data in an input data buffer; and
   a switching means that switches to a state that a CPU is capable of accessing to the input data buffer when the mode signal represents a test mode, wherein
   in the test mode, test instruction data is capable of being inputted from an external circuit.

2. The microcomputer according to claim 1, wherein;
   the serial-to-parallel conversion unit includes an output data buffer that stores data outputted from the CPU to a data bus when the test instruction data provides a data output instruction to the external circuit;
   the serial-to-parallel conversion unit serially converts the data stored in the output data buffer; and the serial-to-parallel conversion unit is capable of outputting a converted data to the external circuit through the data terminal.

3. The microcomputer according to claim 1, wherein;
when a level of the signal at the mode setting terminal is one of a high level and a low level, the mode decoder performs a decoding operation in accordance with a count value of the mode counter; and
when the level of the signal at the mode setting terminal is the other one of the high level and the low level, the mode decoder decodes a signal representing a user mode irrespective of the count value of the mode counter.

4. The microcomputer according to claim 3, wherein;
the mode setting terminal is common with a terminal that fixes an input signal level while operating in the user mode to a level at which the mode decoder decodes the signal representing the user mode.

5. The microcomputer according to claim 1, wherein;
the CPU accesses a program memory while operating in the user mode; and
even when the mode signal represents a test mode, the switching means is capable of performing selection of a state that the CPU access to the program memory.

6. The microcomputer according to claim 5, wherein;
the switching means includes a setting register for performing the selection of the state; and
the switching means performs the selection according to a data value set in the designation register via the serial-to-parallel conversion unit.

7. The microcomputer according to claim 1, further comprising;
an external terminal that is unused or used less frequently in the test mode, wherein;
when the mode signal represents a test mode, an output state of the external terminal is changed from one to another so that an operating mode currently set in accordance with an instruction inputted from the external circuit can be identified by the external circuit.

8. The microcomputer according to claim 1, further comprising;
an external terminal that is unused or used less frequently in the test mode, wherein;
the plurality of operating modes includes one or more reference modes; and
each reference mode provides to change an output state of the external terminal from one to another at a time when the reference mode is set.

9. The microcomputer according to claim 7, wherein
a level of the signal is changed so that the output state of the external terminal is changed from one to another.

10. A functional evaluation chip for evaluating function of a microcomputer and for debugging software in the microcomputer, the chip comprising;
the microcomputer according to claim 1; and
an ICE-adaptive chip having a same function as a part of the function of the microcomputer and including a first connection interface for connecting to an in-circuit emulator, wherein;
the ICE-adaptive chip is coupled with the microcomputer through a second connection interface;
the second connection interface includes the mode setting terminal, a reset signal input terminal, the clock input terminal, and the data terminal; and
the ICE-adaptive chip sets the microcomputer to an ICE mode so that a date is inputted to and outputted from the data terminal, the data for evaluating function of the microcomputer and for debugging software in the microcomputer.

11. The functional evaluation chip according to claim 10, wherein;
when the microcomputer is set to the ICE mode, a part of the microcomputer corresponding to function mounted on an ICE-adaptive chip side stops functioning.

12. The functional evaluation chip according to claim 11, further comprising;
a second microcomputer for functioning according to a plurality of operation modes, including;
a mode counter that counts the number if times of level change in a signal applied to a mode setting terminal;
a mode decoder that decodes output data of the mode counter so as to output a mode signal, wherein the mode signal represents one of the operation modes;
a clock input terminal;
a date terminal through which serial data is inputted synchronously with a serial clock signal applied to the clock input terminal;
a serial-to-parallel conversion unit that coverts the serial data into parallel data and stores the parallel data in an input data buffer; and
a switching means that switches to a state that a CPU is capable of accessing to the input data buffer when the mode signal represents a test mode, wherein
in the test mode, test instruction data is capable of being inputted from an external circuit,
wherein:
the ICE-adaptive chip further includes first and second data terminals;
the first data terminal is coupled with the microcomputer, and the second data terminal is coupled with the second microcomputer;
the ICE-adaptive chip is capable of inputting a first data through the first data terminal together with inputting and outputting a second data through the second data terminal;
the data terminal in the microcomputer is coupled with the first data terminal in the ICE-adaptive chip, and the data terminal in the second microcomputer is coupled with the second data terminal in the ICE-adaptive chip;
the Ice-adaptive chip is capable of setting the microcomputer to a first ICE mode together with setting the second microcomputer to a second ICE mode;
when the microcomputer is set to the first ICE mode, the microcomputer operates only function corresponding to the first ICE mode; and
when the second microcomputer is set to the second ICE mode, the second microcomputer operates only function corresponding to the second ICE mode.

13. The functional evaluation chip according to claim 12, wherein;
each microcomputer logically synthesize a decoded signal corresponding to the ICE mode with a reset signal so that the reset signal is divided into a plurality of channel signals;
the microcomputer cancels one channel signal corresponding to the first ICE mode so that the microcomputer operates only the function corresponding to the first ICE mode; and
the second microcomputer cancels one channel signal corresponding to the second ICE mode so that the second microcomputer operates only the function corresponding to the second ICE mode.

14. A microcomputer for functioning based on a plurality of operation modes comprising;
- a mode signal output unit that outputs a mode signal in accordance with a level of a mode setting signal applied to a mode setting terminal, wherein the mode signal represents one of the operation modes;
- a clock input terminal;
- a data terminal through which serial data is inputted synchronously with a serial clock signal applied to the clock input terminal;
- a serial-to-parallel conversion unit that converts the serial data into parallel data and stores the parallel data in an input data buffer; and
- a switching means that switches to a state that a CPU is capable of accessing to the input data buffer when the mode signal represents a test mode, wherein;
- in the test mode, test instruction data is capable of being inputted from an external circuit, and
- the mode signal output unit sets a width of a voltage range corresponding to a user mode to be larger than a width of a voltage range corresponding to other operating mode.

15. The microcomputer according to claim 14, wherein;
the mode signal output unit sets the voltage range corresponding to the user mode to be disposed on a side including a power level or a side including a ground level.

16. The microcomputer according to claim 14, wherein;
the mode setting terminal commonly provides a terminal that is fixed to a potential in the voltage range corresponding to the user mode.

* * * * *